INVENTORS.
PAUL E. BECKING.
JAMES D. BUNGARD.
BY DONALD J. McCORMICK.

ATTORNEYS

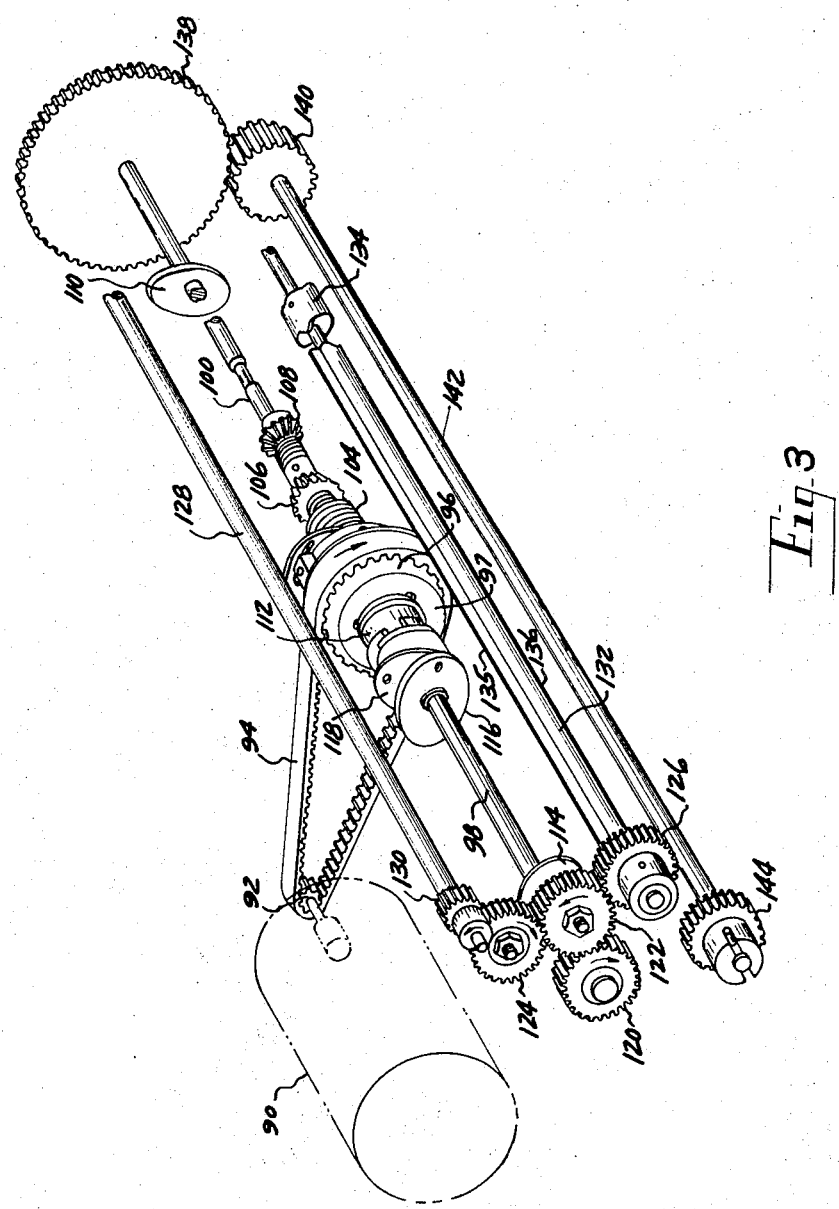

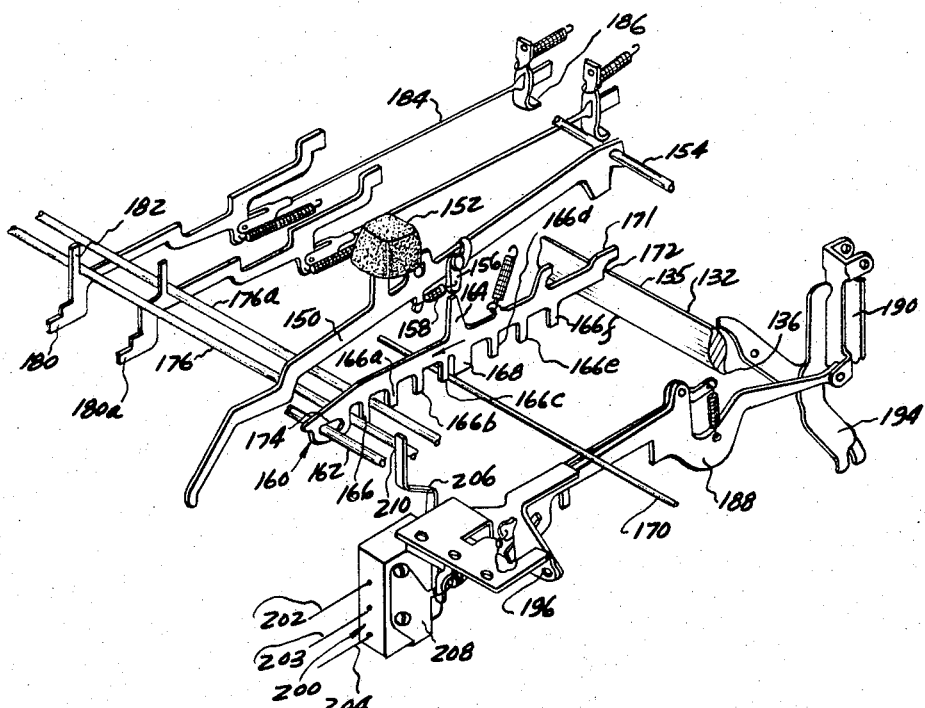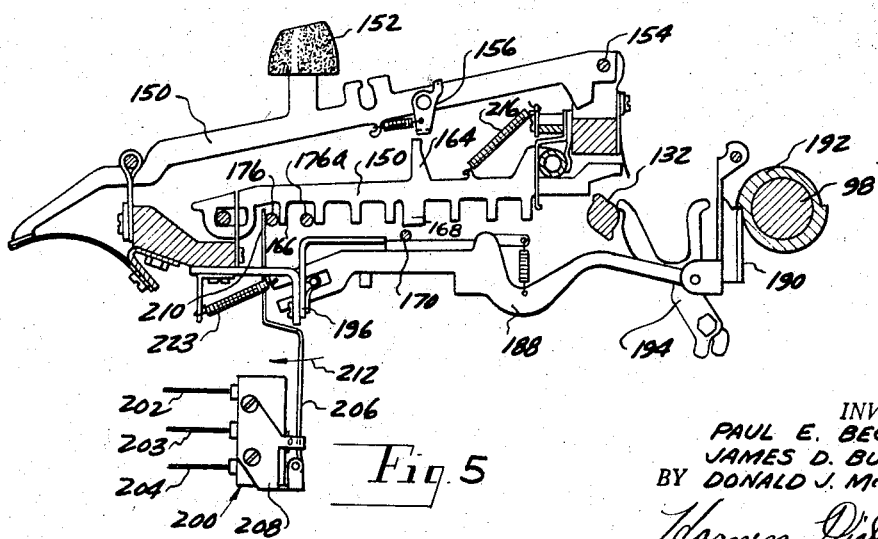

INVENTORS.
PAUL E. BECKING.
JAMES D. BUNGARD.
BY DONALD J. McCORMICK.

ATTORNEYS.

INVENTORS.
PAUL E. BECKING.
JAMES D. BUNGARD.
BY DONALD J. McCORMICK.

ATTORNEYS.

INVENTORS.
PAUL E. BECKING.
JAMES D. BUNGARD.
BY DONALD J. McCORMICK.

ATTORNEYS.

Nov. 21, 1967 P. E. BECKING ETAL 3,353,744
WRITING SYSTEM
Original Filed Oct. 10, 1962 22 Sheets-Sheet 11

INVENTORS.
PAUL E. BECKING.
JAMES D. BUNGARD.
BY DONALD J. McCORMICK.
ATTORNEYS.

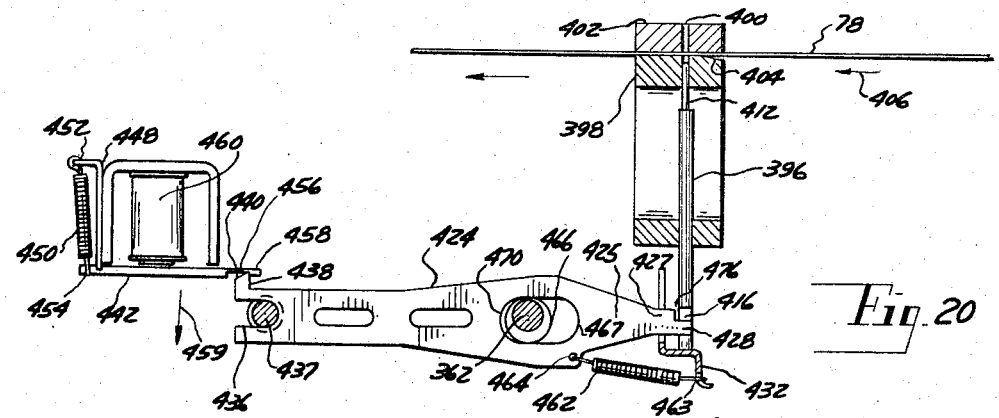
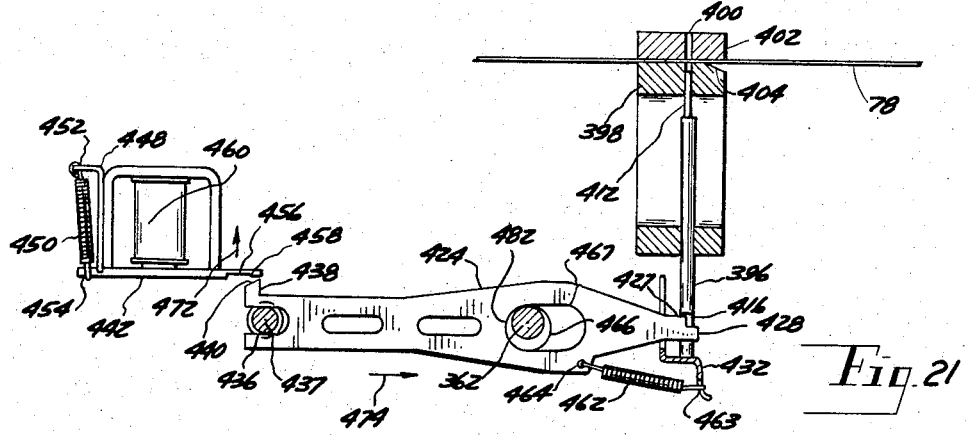
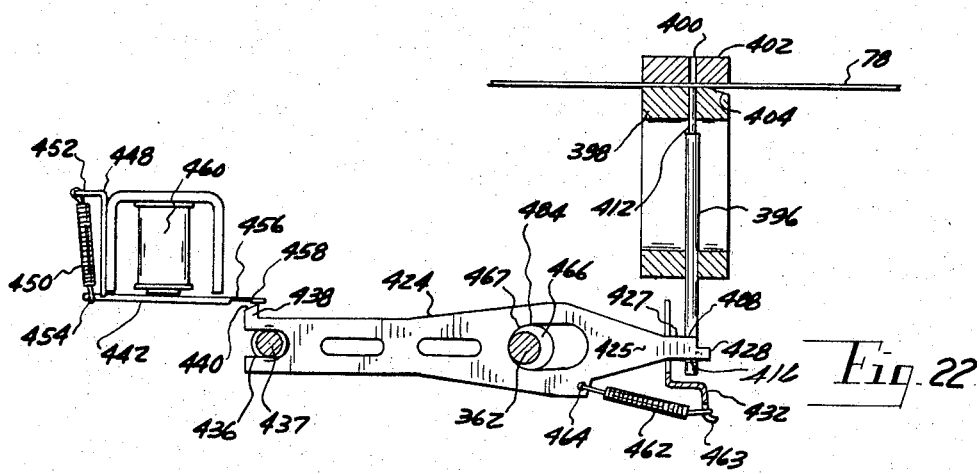

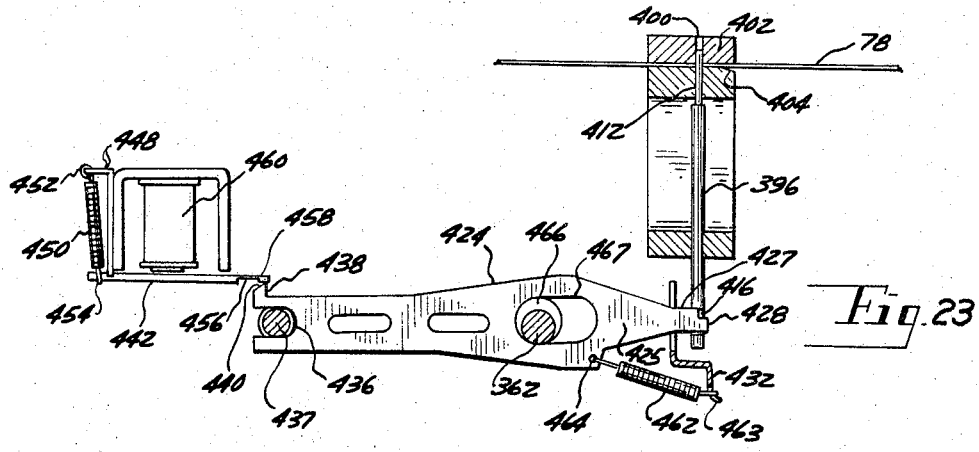
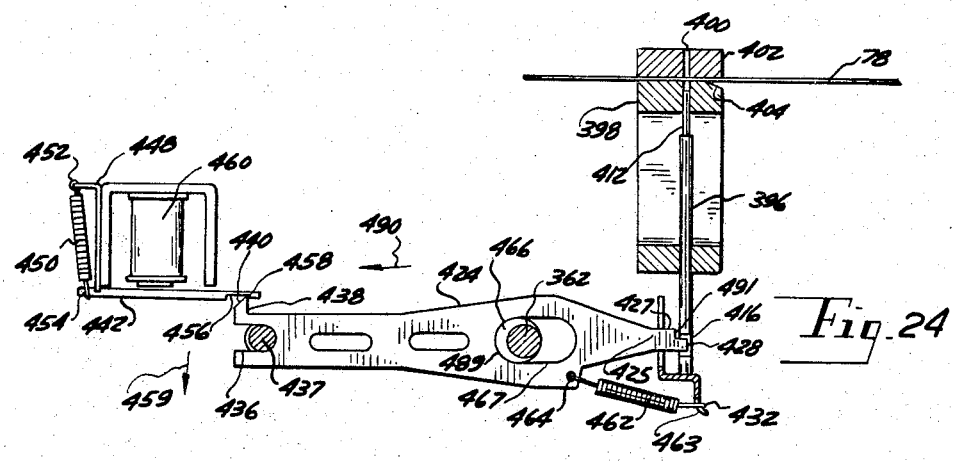
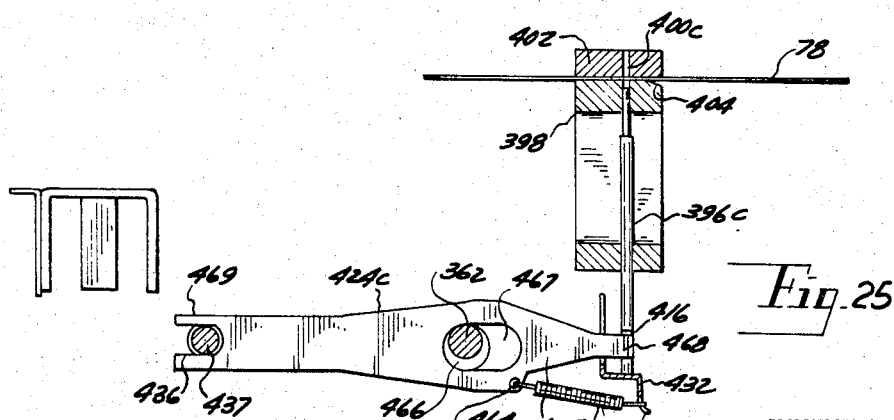

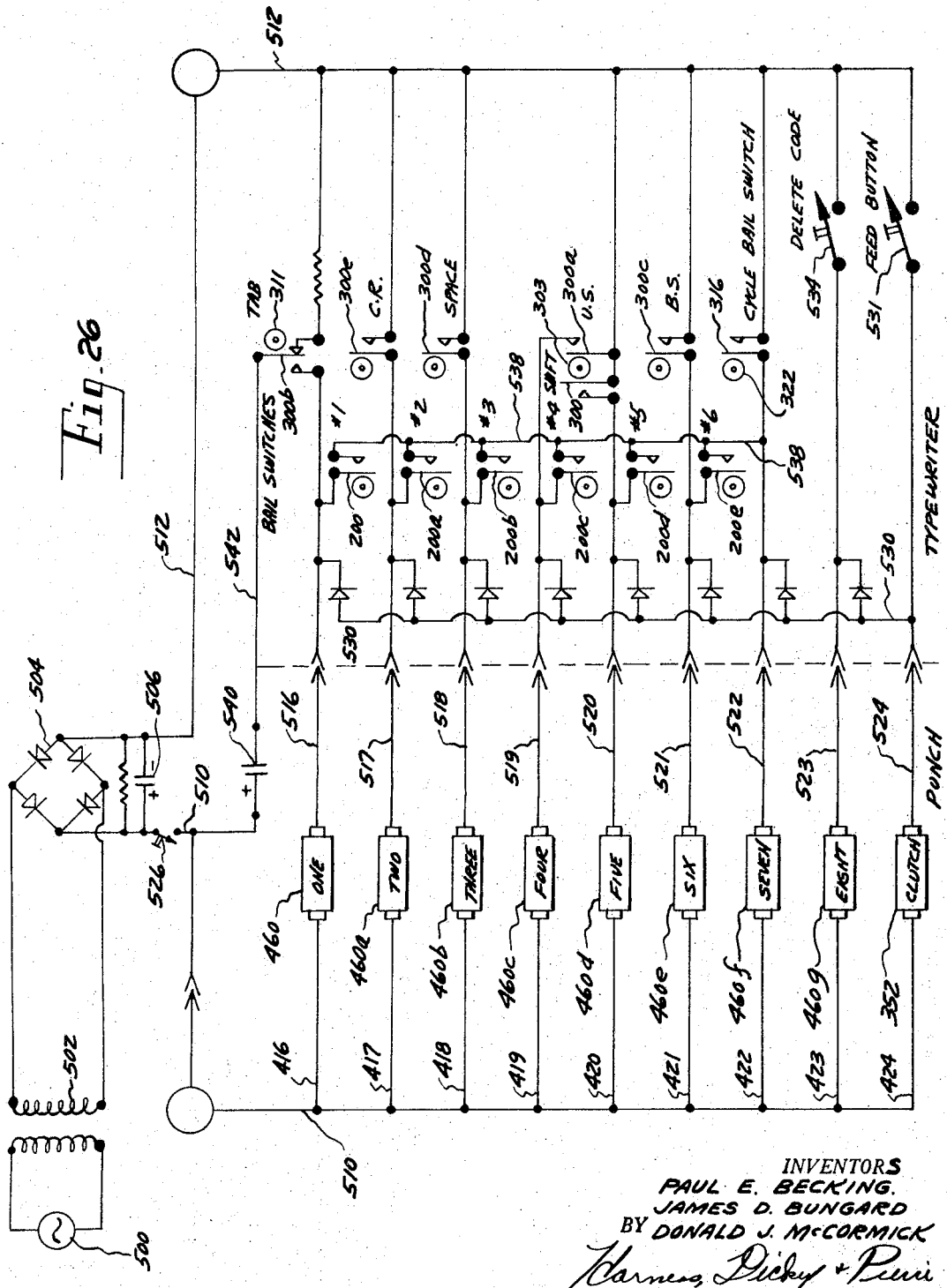

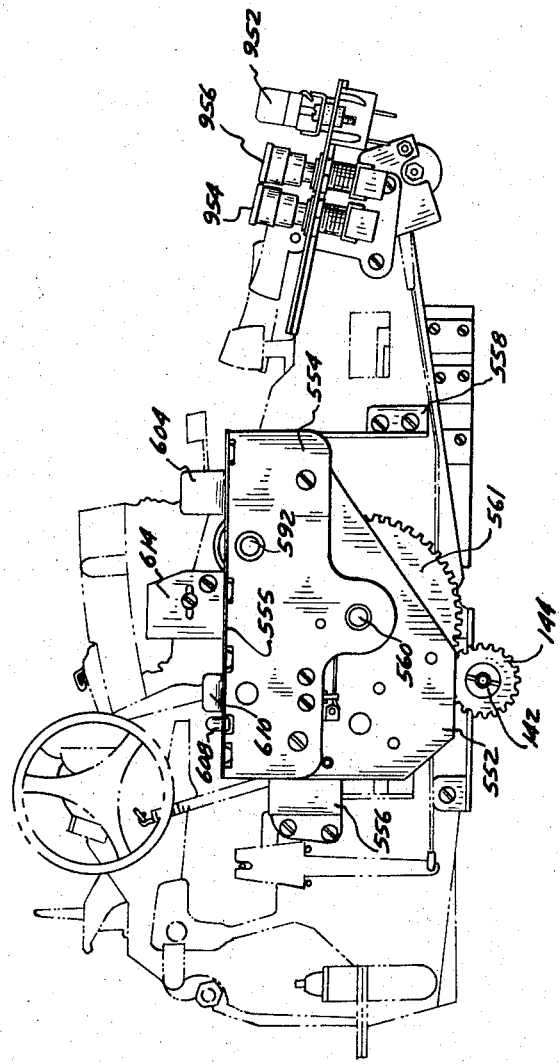

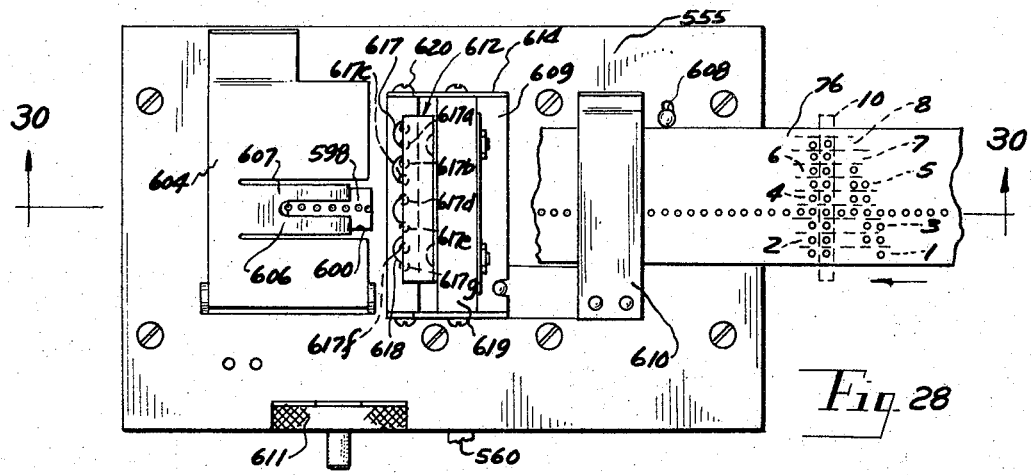
Fig. 28
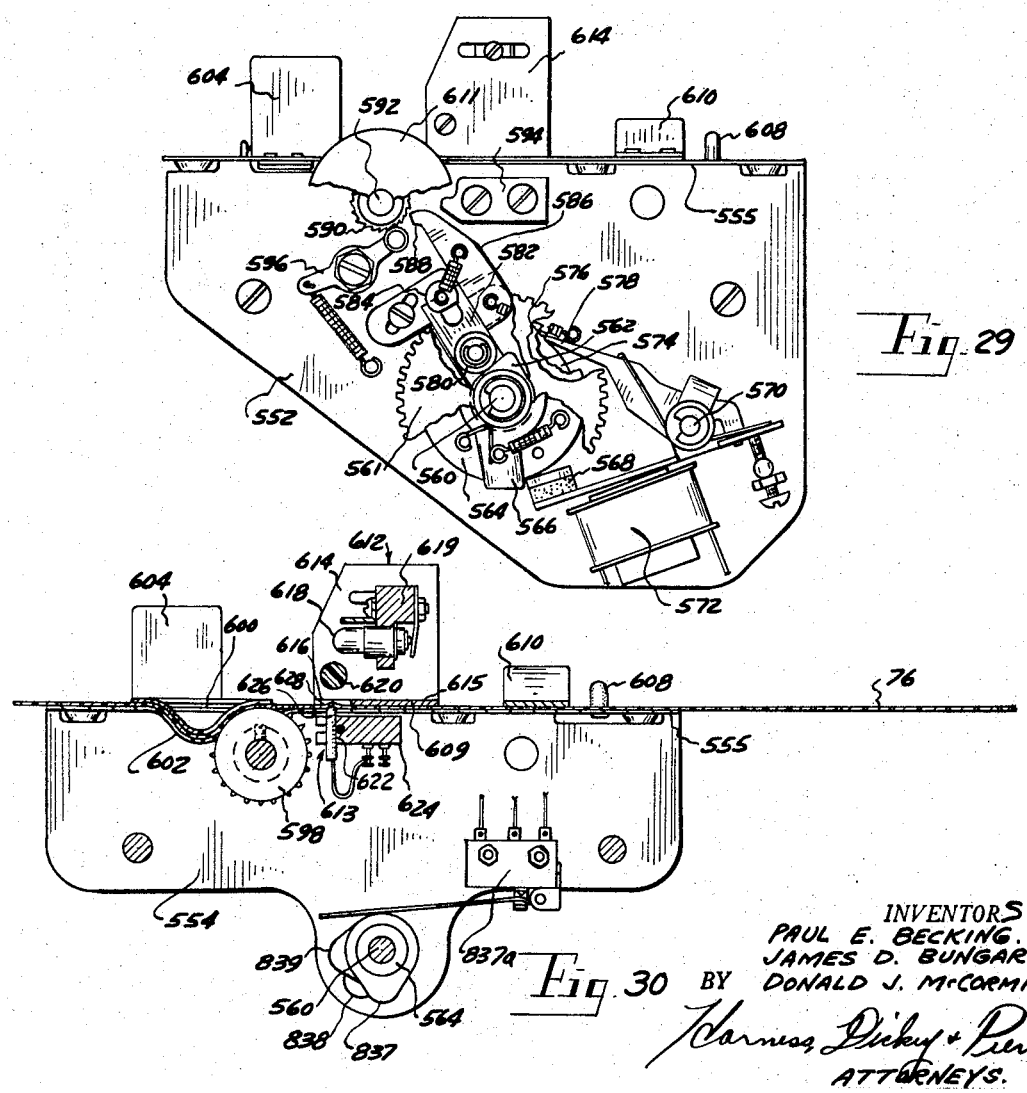
Fig. 29
Fig. 30
INVENTORS.
PAUL E. BECKING.
JAMES D. BUNGARD
BY DONALD J. McCORMICK
ATTORNEYS.

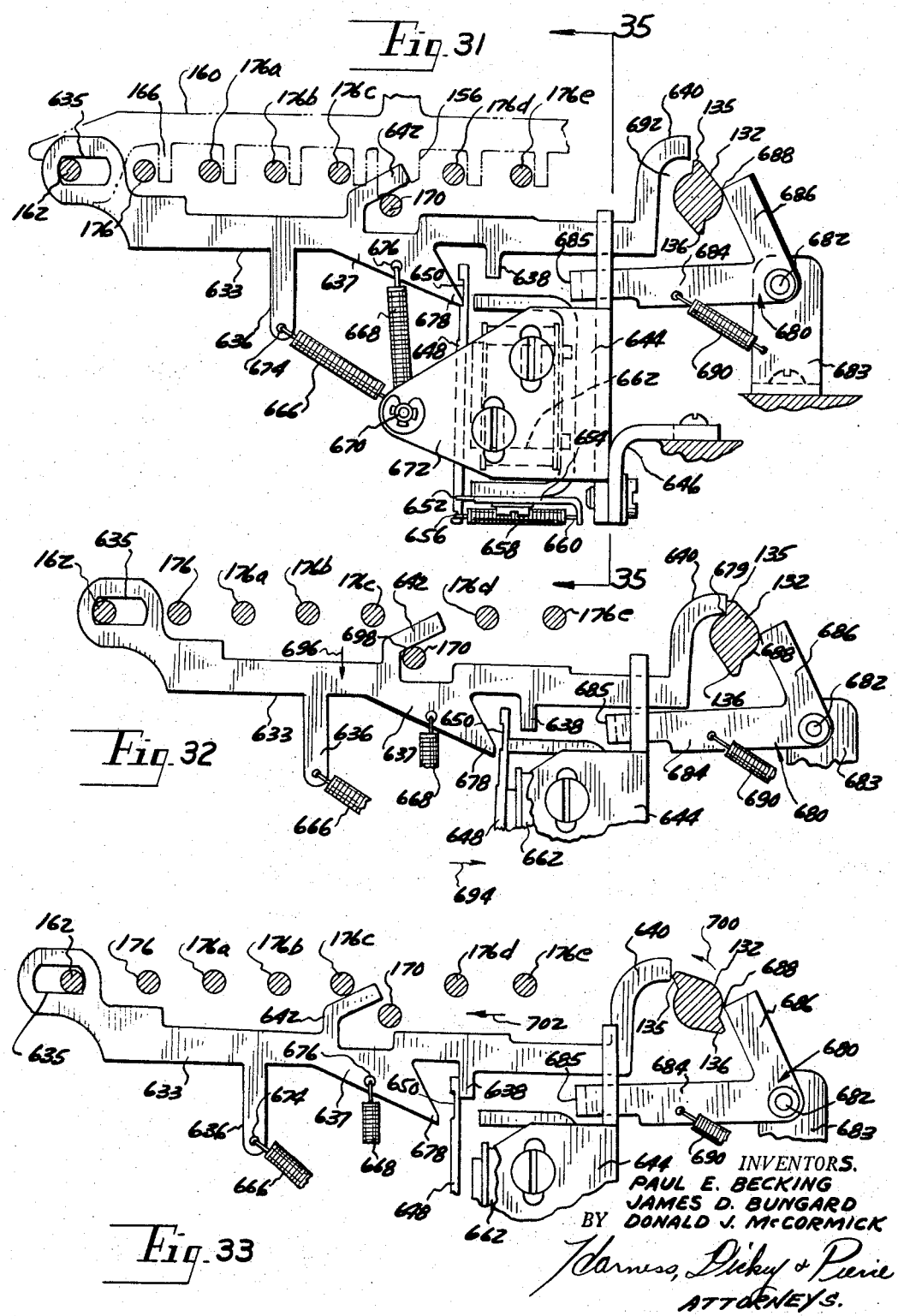

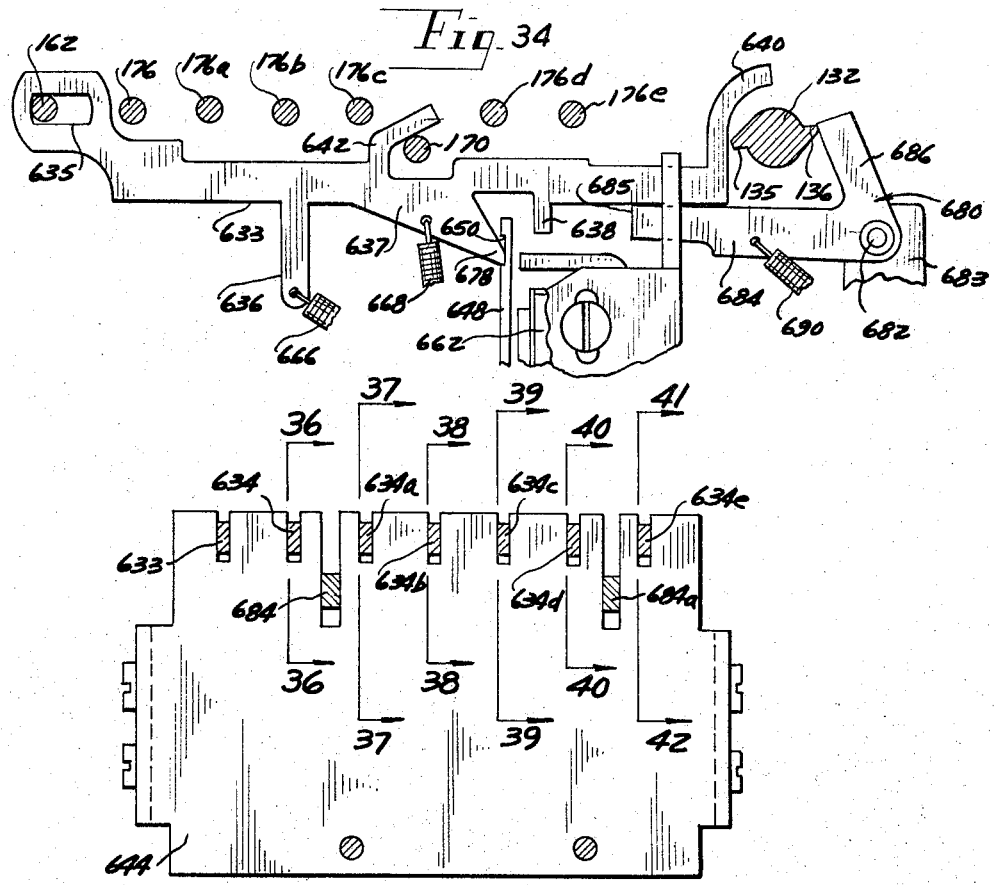
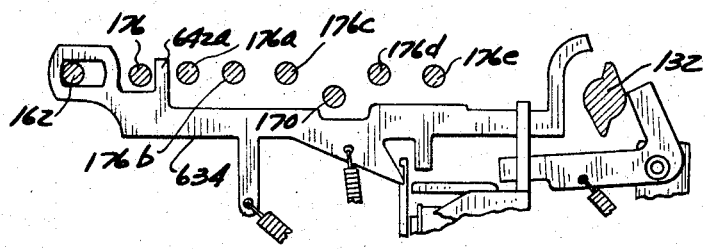
Fig. 34
Fig. 35
Fig. 36

INVENTORS.
PAUL E. BECKING.
JAMES D. BUNGARD.
DONALD J. McCORMICK.
BY
ATTORNEYS.

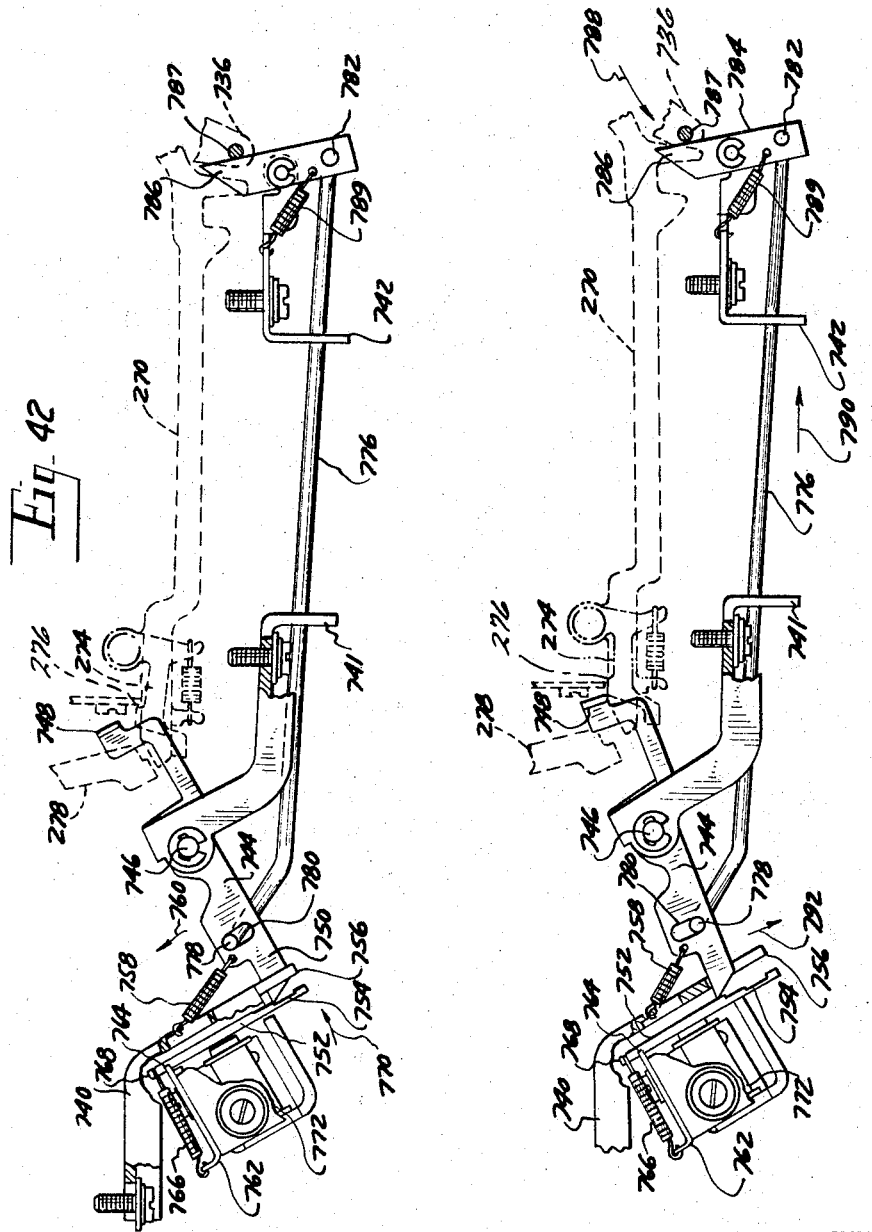

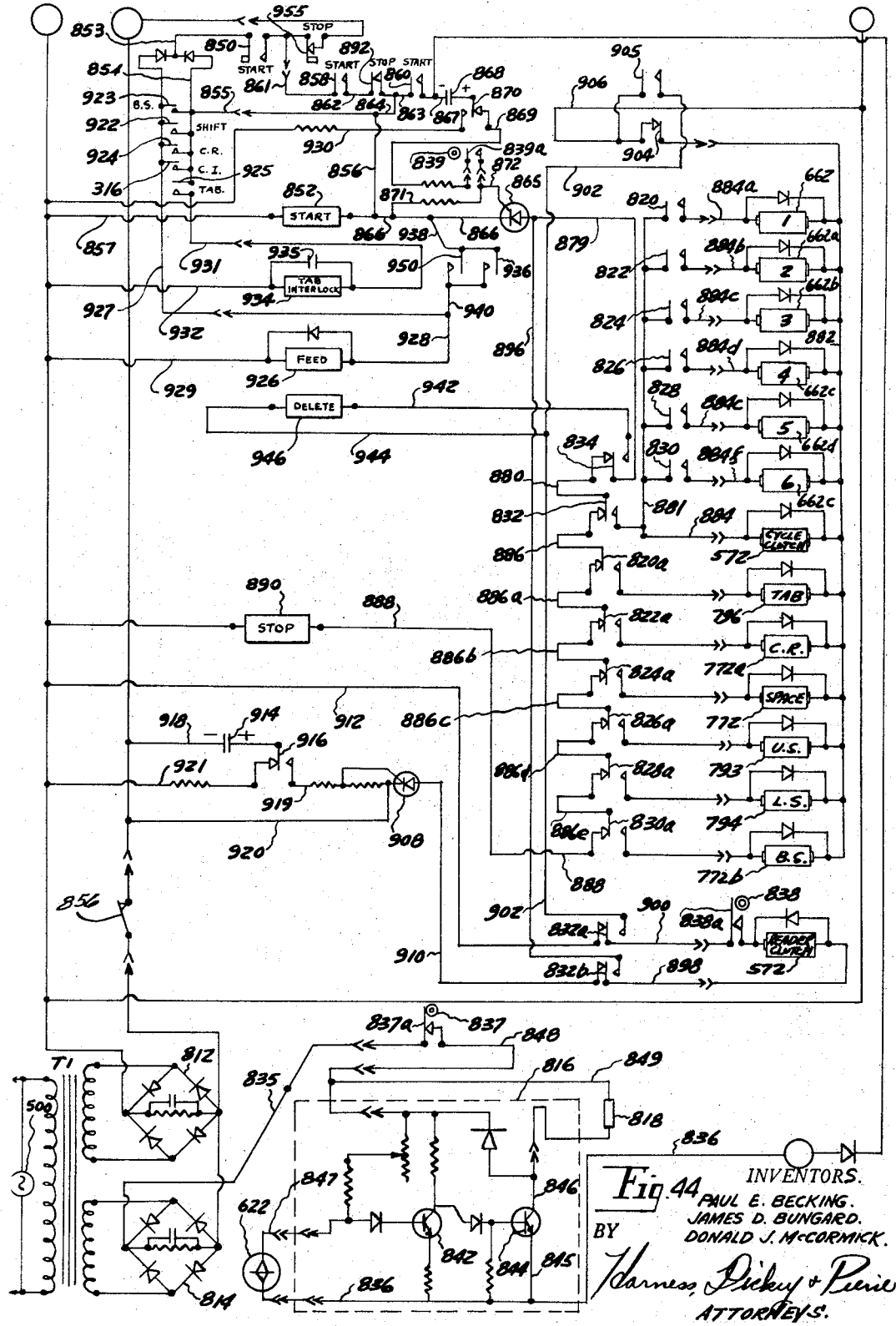

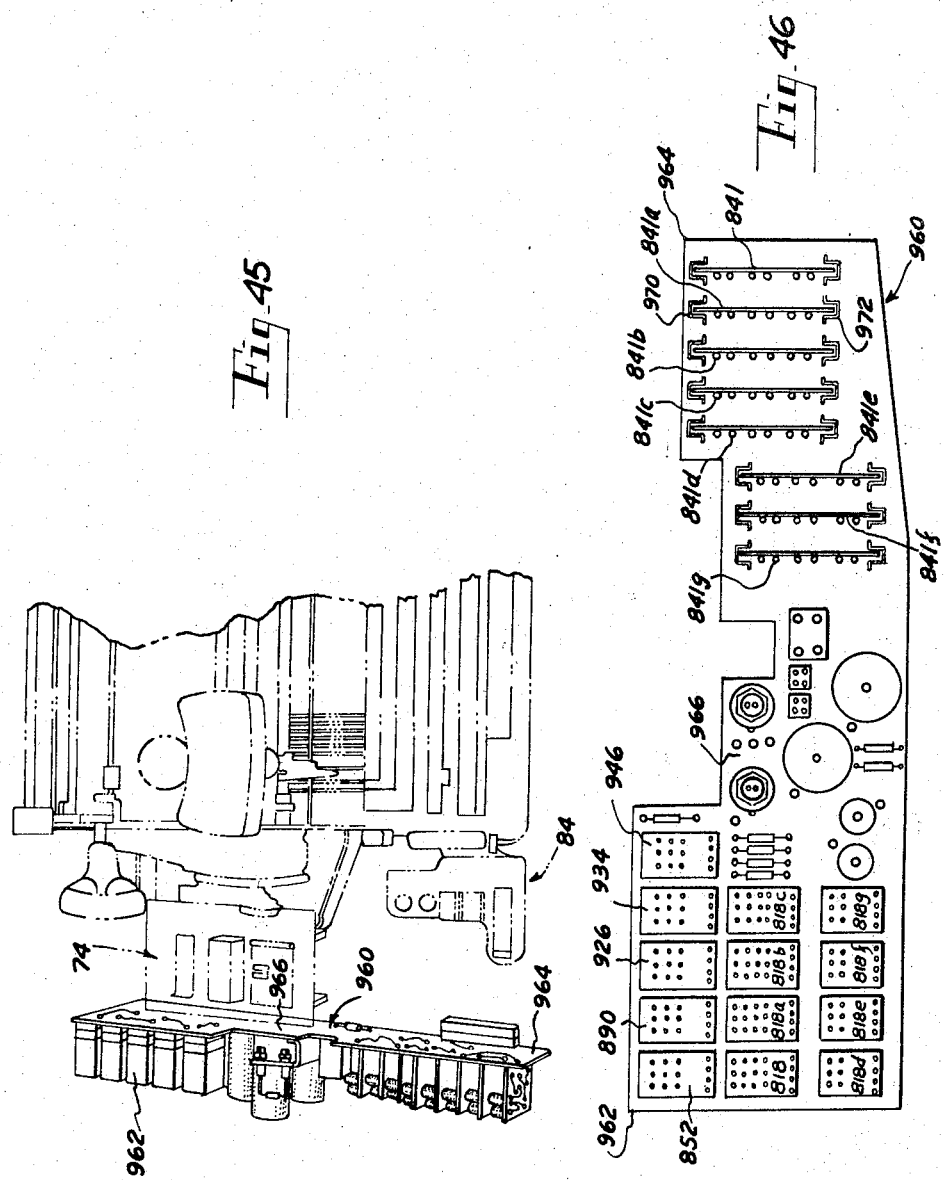

3,353,744
WRITING SYSTEM
Paul E. Becking, Lake Orion, James D. Bungard, East Detroit, and Donald J. McCormick, St. Clair Shores, Mich., assignors to Dura Corporation, a wholly owned subsidiary of Walter Kidde & Company, Inc., Oak Park, Mich., a corporation of New York
Continuation of application Ser. No. 227,767, Oct. 2, 1962. This application June 7, 1966, Ser. No. 559,038
19 Claims. (Cl. 234—54)

This application is a continuation of our copending application Ser. No. 227,767, filed Oct. 2, 1962, now abandoned.

This invention relates to automatic writing systems. In general, the inventive principles of the present invention are embodied in an automatic writing system comprising a manually and automatically operable writer unit, writing operation recording means for making a record of operation of the writing unit which subsequently may be utilized to duplicate the recorded operation of the writing unit step by step, and writing operation reproducing means to produce duplicate operation of the writing unit in accordance with information stored by the record means. Although the broad combination of components have previously been proposed in various forms, previous systems have utilized complicated mechanisms and controls which resulted in limitations in operational speed, high manufacturing costs, high wear rates in use, and costly maintenance programs. Furthermore, the previous systems have tended to be bulky and unwieldy resulting in a generally unattractive system having installation and storage problems.

In the preferred form of the invention, the basic system components comprise: a writing unit in the form of an electrically powered typewriter having operation recording means in the form of punch means for coding a paper tape or the like; and operation reproducing means in the form of reader means for translating information stored on a paper tape or the like into electrical signals, control circuitry energizable by the electrical signals, and writing unit actuating means responsive to energization of the control circuitry and connected to the writing unit to produce operation thereof in accordance with the information on the paper tape. The components have been incorporated in a system capable of being housed in a single compact casing approaching the size and appearance of a conventional typewriter casing alone. Consequently, the system may be stored, transported, and installed with the convenience of a simple typewriter unit. Furthermore, the system components have been changed in design, substantially reduced in number and simplified, rearranged in combination, and cooperatively associated in an improved manner resulting in substantial reduction in cost, in improved high speed operation, and in durability and reliability in use.

A primary object of the present invention is to provide a new and improved high speed automatic writing system.

Another object of the present invention is to provide a high speed automatic writing system having writing operation recording means and writing operation reproducing means associated with a writing unit in a manner permitting operation of the writing unit at maximum speed during all system operations involving either or both the recording means and the reproducing means. In other words, a purpose of the present invention is to provide an automatic writing system wherein maximum writing speed is determined solely by the writing unit so that supplementary operations such as coding tape by means of an associated punch, reading tapes by reader means associated therewith for causing automatic operation of the writing unit, or reproduction of extra tapes while the writing unit is automatically controlled will not affect the system speed.

Another object of the present invention is to provide an integrated writing system comprising, in a single casing, a writing unit, writing operation recording means, writing operation reproducing means, a power source, and associated controls. In this regard it is a further object of the invention to provide a new and improved writing unit, operation recording means, and operation reproducing means combination facilitating a balanced and compact association of parts requiring a minimal increase in size of a single enclosing casing relative to the size of a casing required for the writing unit alone.

Still another object is to provide an automatic writing system comprising a writing unit, operation recording means, and operation reproducing means integrally associated within a single housing formed by upper and lower shells wherein the writing unit is centrally located relative to the ends of the housing and a record receiving means associated with the operation recording means is located at one end and a record receiving means associated with the operation reproducing means is located at the opposite end.

Another general object of the present invention is to provide an improved drive arrangement for operating a writing unit, a punch of a writing operation recording means, and a reader of a writing operation reproducing means from a common power source.

An object of this invention is to provide an automatic writing system wherein a writing unit is connected to a punch means in a novel and improved manner for operation of the punch means to code a tape record in accordance with the operation of the writing mechanism. To this end punch controlling solenoid means are directly electrically operable by simple switch mechanisms operated directly and positively by mechanical association with appropriate mechanisms of the writing unit. In accordance with this object of the invention, switch means having extended actuation fingers are mounted interiorly of the system casing and protrude into the writing unit at appropriate points for direct actuation by the operating mechanisms thereof at appropriate times to cause energization of the solenoid means associated with the punch means and coding of all printing operations and functional operations of the writing unit on a tape record.

A further object is to provide new and improved controls for directly actuating a writing operation recording means by operational mechanisms of the writing unit without the necessity of additional interposers, links, levers, cams, bails, restorers and the like.

Another specific object is to provide, in an automatic writing system, a new and improved punch means. In this regard, it is a further object of the invention to provide an improved means of operably connecting individual punches to punch drive means. To this end new and improved interposer means are provided which facilitate accurate and positive control of the individual punches with a minimum of associated interposer control parts. The interposer means and the individual punches are provided with special connecting drive means which permit actuation of the interposer means to drive the punches by a common drive means in a new and improved manner whereby punch interposers are positively reset and the punches are positively driven to and from punching engagement with a tape.

A further specific object of the invention is to provide a new and improved automatic writing operation reproducing means in a writing system including a writing unit and a writing operation recording means mounted in a common casing. In this regard, it is an object to provide new and improved photoelectric reader means permitting high speed operation with positive and accurate translation of information from a record into electrical signals. To this end photoelectric means capable of generating electrical signals and a light source means for actuating the photoelectric means are arranged in an improved manner to obtain accurate translation of recorded information at maximum speeds.

An additional object is to provide new and improved writing operation reproducing means for operating a writing unit in response to signals obtained by a record reading operation. In this regard it is an object of the invention to provide mechanical translation means to actuate a writing unit having a manually operable keyboard by direct connection and association with the writing unit printing operations mechanism and functional operations mechanism without the necessity for or actuation of the writing unit keyboard mechanisms.

A further object is to provide a new and improved control means for actuating a writing unit in response to control signals obtained through a record reading device. To this end, new and improved circuit means are provided which permit continuous operation at maximum speed by obtaining a new set of control signals from the record means during writing unit operation in response to a previously obtained set of control signals whereby the next writing unit operation will begin immediately upon completion of the previous writing unit operation. Input signal relays and interposers are associated with the control circuitry in a new and improved manner to enable input signals for subsequent writing unit operation to be stored until completion of operation of the writing unit occurring during the time the input signals are received.

It is an object of the invention to provide simplified means for actuating a writing unit from a control tape record by actuation of mechanical control devices through solenoids energized in response to signals generated by photoelectric devices. To this end, novel mechanical actuating mechanisms are associated with the writing unit to duplicate printing operations and functional operations in response to input signals from a tape control system. The mechanisms are actuatable to duplicate printing and functional operations of the writing unit at points intermediate the input of control signals and the responsive actuation of the writing unit in manual operation. That is, the automatic record controlled mechanism is integrated with the manually controllable writer unit to completely bypass the key selection mechanism.

Still another object of the present invention is to provide new and improved control circuitry and electrical components integrated in a single casing with an automatic writing system comprising an electric writing unit, a writer operation recording means, and a writer operation reproducing means. To this end, an improved electrical control circuit and component arrangement is provided which includes a main input signal control board mounted adjacent the recording means and integrated within the writing system casing. The controls comprise, for each output signal to the writing unit, a separate relay unit individually connectable into the board and replaceable; and, for each input signal from the record means, a separate circuit plate individually connectable and replaceable into the board so that the control circuitry is susceptible of wide variations and change when necessary. To this end, the control board and circuit plates are in the form of printed circuits.

The foregoing objects, and others, are attainable by utilization of the inventive principles as hereinafter disclosed by reference to an illustrative writing system embodiment of the invention shown in the accompanying drawings wherein:

FIGURE 3 is a perspective view of the drive mechanism of the apparatus shown in FIG. 1;

FIGURE 4 is a perspective view of a portion of the printing operation mechanisms of the apparatus of FIG. 1;

FIGURE 5 is a side elevational view of a portion of the mechanism shown in FIG. 4;

FIGURE 20 is a side elevational view of a portion of the punch apparatus;

FIGURE 21 is a side elevational view of the apparatus shown in FIG. 20 in a subsequent operational position;

FIGURE 22 is a side elevational view of the apparatus shown in FIG. 21 in a subsequent operational position;

FIGURE 23 is a side elevational view of the apparatus shown in FIG. 22 in a subsequent operational position;

FIGURE 24 is a slide elevational view of the apparatus shown in FIG. 23 in a subsequent operational position;

FIGURE 25 is a side elevational view of another portion of the punch apparatus;

FIGURE 26 is a circuit diagram illustrating the control system for the writing operation recording means of the present invention;

FIGURE 27 is an elevational view of the other end of the writing mechanism of FIG. 1 with parts removed to show the reader apparatus;

FIGURE 28 is a plan view of the reader apparatus;

FIGURE 29 is a side elevational view of the reader apparatus clutch;

FIGURE 30 is a sectional view taken along the line 30—30 in FIG. 28;

FIGURE 31 is a side elevational view of apparatus for causing print operations of the writing unit in accordance with signals generated by the reader apparatus;

FIGURE 32 is a partial side elevational view of the apparatus shown in FIG. 31 in another operational position;

FIGURE 33 is a partial side elevational view of the apparatus shown in FIG. 32 in another operational position;

FIGURE 34 is another side elevational view of the apparatus shown in FIG. 33 in another operational position;

FIGURE 35 is a sectional view taken along line 35—35 in FIG. 31;

FIGURE 36 is a sectional view taken along the line 36—36 in FIG. 35;

FIGURE 42 is a side elevational view of apparatus for causing functional operations of the writing unit in accordance with signals generated by the reader apparatus;

FIGURE 43 is a side elevational view of the apparatus shown in FIG. 42 in another operational position;

FIGURE 44 is a circuit diagram illustrating the control system for the writing operation reproducing means of the invention;

FIGURE 45 is a partial perspective view of the reader end of the apparatus shown in FIG. 1 with parts removed to show control system attachments; and FIGURE 46 is a side elevational view of the control attachments shown in FIG. 45.

The writing system unit

Figure 1:
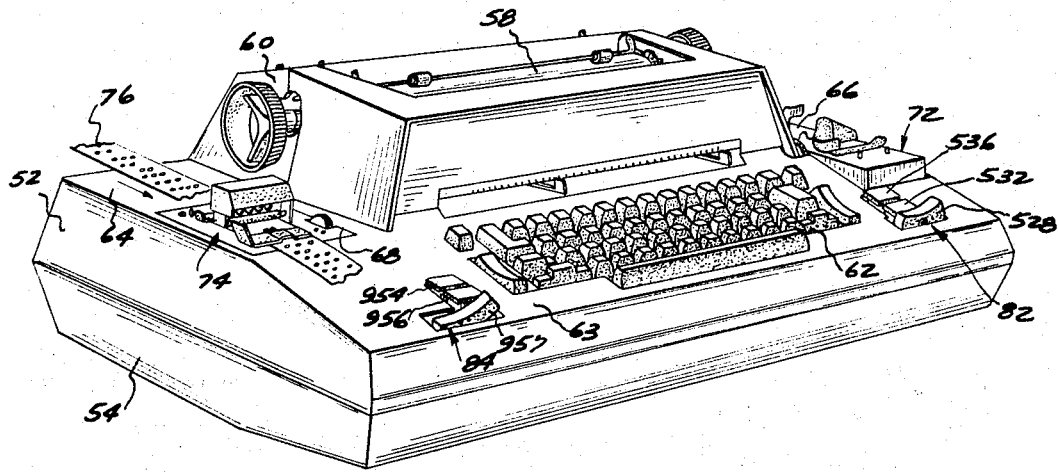
FIGURE 1 is a perspective view of the illustrative embodiment of the invention.
Figure 2:
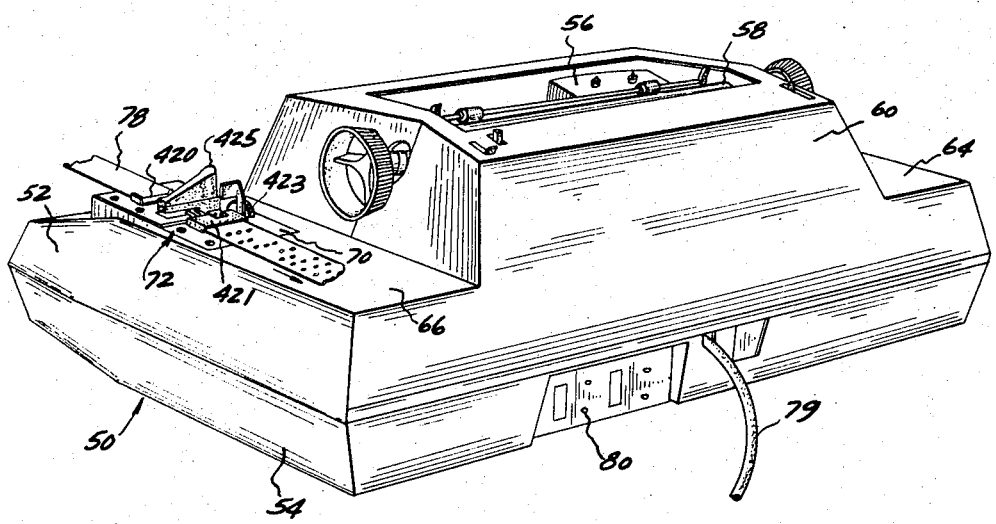
FIGURE 2 is another perspective view of the apparatus shown in FIG. 1.

Referring now to FIGS. 1 and 2, the subject writing system is shown completely enclosed within a housing 50 which may be formed by upper and lower casing shells 52, 54. The writing unit comprises an electric typewriter centrally located within the housing. The upper portion of the typewriter, including a type head unit 56 and a platen 58, is enclosed by a centrally located raised portion 60. The keyboard 62 and associated controls are centrally located in an inclined front panel 63 of the housing. Substantially flat deck portions 64, 66 are provided on each side of the central raised portion 60. Centrally located cutouts 68, 70, into which the upper record receiving portions of a record forming means 72 and a record reader means 74 protrude, are provided at each side of the central raised portion. The record means comprises paper tapes such as illustrated at 76 and 78, but can, in the broadest aspects of the invention, take other forms such as magnetic tapes, discs, etc.

The record forming means 72 comprises a punch means which is selectively operable in response to actuation of the writing unit to prepare a coded record of the writing operation on the paper tape 78. Preselected codes of conventional binary code form are recorded on the tape by punched holes arranged in columns extending transversely of the tape. In the preferred embodiment, an eight channel code is utilized although other code forms also may be utilized as desired. Each column of holes represents a separate print operation or functional operation of the typewriter. The term print operation refers to those typewriter operations concerned with the selection of a particular type character and the printing of that character. The term functional operation refers to those typewriter operations concerned with implementing the print operations such as tabulation, indexing, carrier return, shift, backspace, etc. The reader means 74 is adapted to decode paper tapes 78 and cause actuation of the writing unit in response thereto to duplicate all of the original writing operations which occurred during the production of the coded tapes 78.

As may be seen in FIG. 2, the only system component external to the housing is lead-in wire 79 which is connectable to a suitable power source. However, in order to permit the writing system to be associated with other apparatus in more complicated systems, a plurality of jacks 80 may be suitably located as in the back of the machine. In this manner, the subject writing system may be associated with other writing system components and other business machines to provide a wide variety of applications and programming. In addition to the keyboard 62 for manual operation of the writing unit, a punch control cluster 82 is provided on the right hand side of the upper casing adjacent the punch means and a reader control cluster 84 is provided on the left hand side of housing adjacent the reader means.

The illustrative writing mechanism of the present writing system takes the form of a high speed electrically operated typing machine of conventional design which is modified as hereinafter described in detail for association with the subject writing system. In the preferred embodiment, the typewriter has a sphere-type printing head on which all of the type characters are integrally formed rather than a plurality of individual type bars. The print operations and functional operations of the typewriter are powered by means of an electric motor after manual selection by an operator through the keyboard and associated controls. The typewriter is of conventional design and is manufactured by International Business Machines under the model designation Series 72. The details of operation of the typewriter are fully disclosed in the "Series 72 Instruction Manual," copyrighted 1961, which is hereby made a part of and incorporated into the present disclosure. Since the typewriter mechanism is commercially available, and well understood by those in the writing system art, only sufficient details will be hereinafter disclosed for description of the writing system in which the inventive principles are incorporated.

System drive arrangement

Referring now to FIG. 3, the drive mechanism of the writing system comprises a single power source 90 in the form of a conventional electric motor which is adapted to drive a pinion 92 and a drive belt 94. The drive belt is drivingly connected to a drive pulley 96 mounted on a hub 97, which rotatably supports shaft members 98, 100. The opposite ends of the shafts are rotatably supported in suitable bearing means mounted at the sides of the writing unit on a portion of the typewriter frame.

The shaft 100 is conventionally referred to as the operational cam shaft and is continuously rotatably connected to the hub 97. A torque limiter means 104 and drive pinions 106, 108 are mounted on the continuously rotating shaft 100 and form part of the typewriter carrier return and tab mechanisms. A plurality of cams are also mounted on the shaft 100 for control of certain functional operations and are shown schematically at 110. All powered functional operations of the writing unit are powered by the shaft 100 and include the space bar, backspace, carrier return, indexing, and shift operations. The shaft 100 also controls the speed of the carrier during a tab operation.

The shaft 98, conventionally referred to as a cycle shaft, is connected to the drive hub 97 through a spring clutch arrangement 112 which operates the cycle shaft whenever a character selecting key lever is depressed. A plurality of cams 114, 116 and 118 are mounted on the cycle shaft for rotation therewith. The clutch 112 controls rotation of the cycle shaft and cams, and limits rotation thereof to 180° for each time a key lever is depressed. The cams power the position of the type head through conventional mechanisms, which are conditioned by key lever actuation to obtain the selected print operation when the cycle shaft is operated.

A pinion 120 is mounted on the end of cycle shaft 98 and is drivingly associated with a cluster of gears 122, 124, 126. A print shaft 128 extends longitudinally of the typewriter and is rotatably mounted in the typewriter frame at the sides of the writing unit. In the present description, longitudinal is assumed to be parallel to an axis extending between the sides of the writing unit parallel to the shafts 98, 100, 128. The gear 124 and a drive gear 130 actuate the shaft 128 which in turn operates the print mechanism of the typewriter, the type aligning mechanism, and the ribbon fed and lift mechanisms. Another control shaft 132, commonly referred to as the filter shaft, extends longitudinally of the writing unit parallel to the other shafts and is rotatably secured at its ends in the typewriter frame. The filter shaft is driven by gear 126 and supports an escapement cam 134 on one end. The filter shaft has cam means formed thereon having opposite lobes 135, 136 and is adapted to operate the character selection mechanism, a print escapement, a shift interlock, and a space bar lockout device.

A gear 138 is mounted on the end of the continuously rotating shaft 100 and is drivingly associated with a drive pinion 140 mounted on a longitudinally extending reader operating shaft 142 rotatably supported at the sides of the typewriter unit. The gear 138 is operatively connected to the punch means in a manner hereinafter disclosed in detail. The other end of the shaft 142 includes a reader means drive gear 144 adapted to be operatively connected to the reader means in a manner hereinafter described in detail.

*Writing unit print operation mechanism*

Referring now to FIGS. 4-8, the manual operation of the typewriter by depression of a key lever is described by reference to a single key lever 150 and its associated operating mechanism. It will be understood that the other key levers of the keyboard are similarly operable. In general, actuation of a key lever 150 prepares print character selection mechanism for operation and trips cycle shaft clutch means to actuate the cycle shaft and cause a print operation.

Referring now particularly to FIG. 4, each key lever 150 is manually operable by depression of a key button 152 causing pivotal downward movement about a pivot shaft 154. A pawl 156 is pivoted to the key lever and biased to a downwardly extending position by a pawl spring 158. A selector interposer 160 is mounted beneath each of the key levers on a pivot rod 162. An upwardly extending lug 164 is located for abutting engagement with the pawl 156 of the key lever to cause downward movement of the selector interposer. A plurality of selector lugs 166–166f are provided along the bottom of the selector interposer in varying spaced relationship. Each selector interposer has a different selector lug arrangement. However, a common lug 168 is provided centrally of each interposer and is adapted to engage a cycle clutch shaft actuating bail 170. The rear of the interposer is provided with a latch surface 171 and a cam surface 172 adapted to be engaged by the cam portions 135, 136 of filter shaft 132. The interposer 160 is pivotally mounted on the pivot shaft 162 by means of an elongated slot 174 which permits longitudinal displacement as well as pivotal movement of the interposer.

Six selector bails 176–176e (FIG. 8) extend transversely of the key levers and the selector interposers. Portions of the selector bails extend through the selector interposers adjacent the selector lugs. The selector bails 176 are located between the different selector lugs 166 of the selector interposers 160 for selective engagement therewith and lateral displacement thereby. The selection of particular bails and interposers is accomplished by downward pivotal movement of the selector interposers during key lever actuation. When a selector interposer has been downwardly pivoted, the filter shaft 132 rotates one of the cam portions 135, 136 into engagement with the cam surface 172 and drives the selector interposer away from the filter shaft. Latch interposers 180–180e are operatively connected to the selector bails. Lug means 182 are mounted on the latch interposers and adapted to be selectively engaged and driven by selector bails 176–176e during lateral displacement thereof. The latch interposers are connected by rods 184 to selector latches 186 which control location of the print head to select a particular print character and condition the typewriter for a print operation powered by the cycle shaft 98.

Operation of the cycle shaft is attained during pivotal downward displacement of the selected interposer by engagement of the lug 168 with cycle clutch bail 170. Downward displacement of the cycle clutch bail actuates a latch link 188 which in turn releases a latch lever 190 controllably associated with a cycle clutch sleeve 192 forming part of the cycle clutch 112 as shown in FIG. 5. A latch restoring mechanism 194 is pivotally mounted adjacent the latch 190 and is engageable at one end by the filter shaft 132 to return the latch 190 to restraining engagement with the clutch sleeve 192. The other end of the latch link 188 is slidably supported on bracket means 196.

*Punch code selecting means for print operations*

Figure 7:
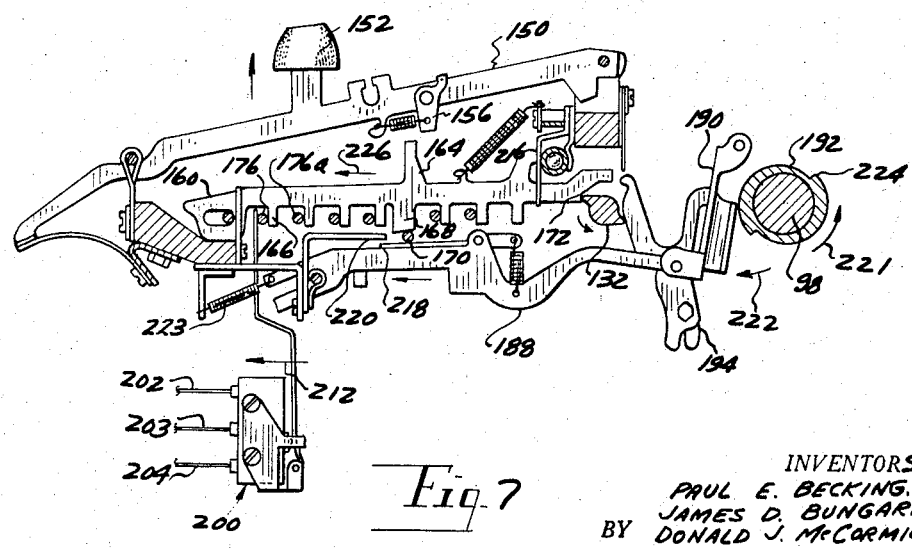
FIGURE 7 is another side elevational view of the apparatus shown in FIG. 6 in another operational position.
Figure 8:
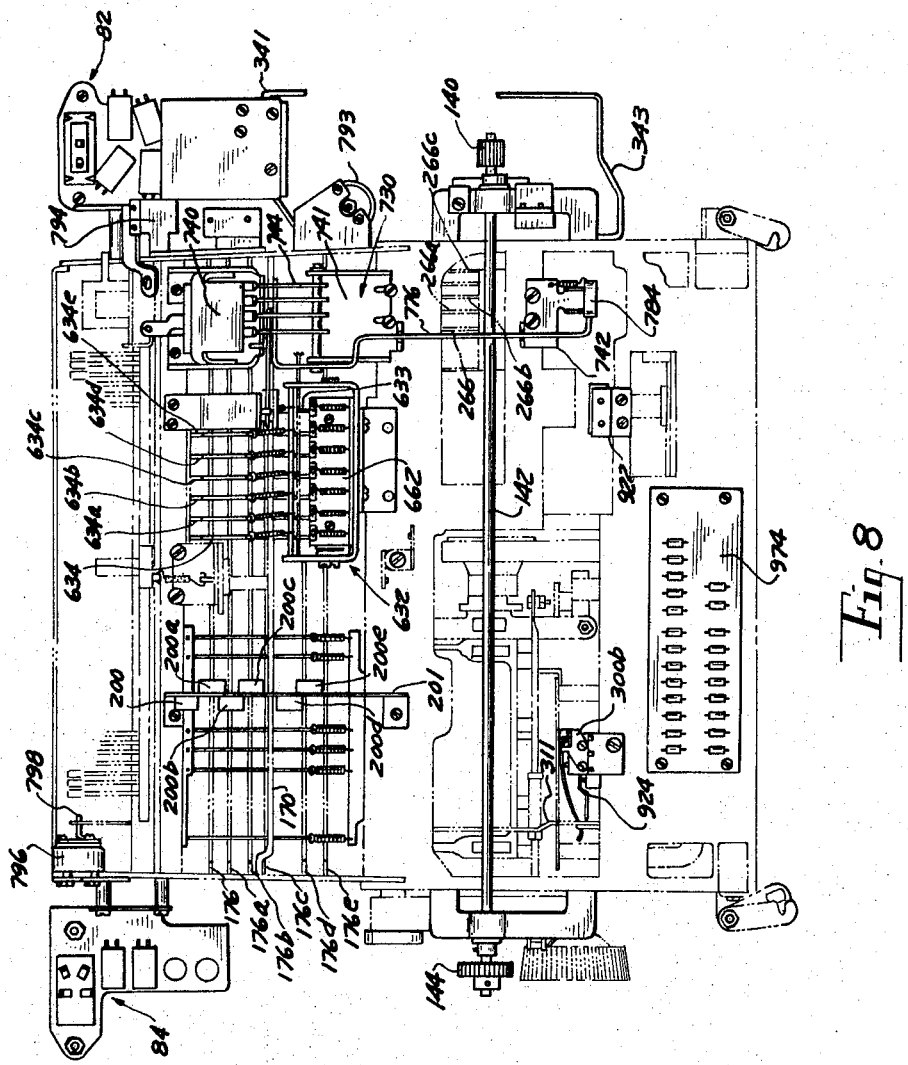
FIGURE 8 is a bottom view of the writing unit of FIG. 1.

The selector bails 176 must be selectively actuated in a predetermined combination to obtain a particular print operation. Consequently, the lateral movement of the selector bails reflects a particular print character selection. Therefore, movement of the selector bails 176 may be advantageously utilized to generate control signals for the punch means in a code corresponding to the selection and actuation of the selector interposers and the selector bails. A punch code selection means is provided by electrical signal generating means in the form of switch means of limit switch type devices 200–200e which are secured to a frame portion of the writer unit by a bracket 201 or the like, as shown in FIG. 8. The term "limit switch" is intended to define self-contained switching units operable by moving mechanisms to control associated circuitry. Referring again to FIGS. 4–8, the switch means control energization of punch selection circuitry by leads 202, 203, 204. Each switch is actuatable by means of an elongated actuating arm 206 which is pivoted on a bracket 208 at the side of the switch 200 and extends upwardly into the writing unit mechanism for direct engagement with one of the selector bails as shown at 210. The actuating arm 206 is spring biased outwardly into constant engagement with the selector bail. Consequently, any movement of the selector bail will cause corresponding rotative movement of the actuator arm 206 in the direction of the arrow 212 and close switch 200 to complete a circuit through the lines 202, 204. It is to be understood that each of the selector bails has a switch means 200 and a punch selection circuit associated therewith.

*Operation of writing unit print mechanism*

Figure 6:
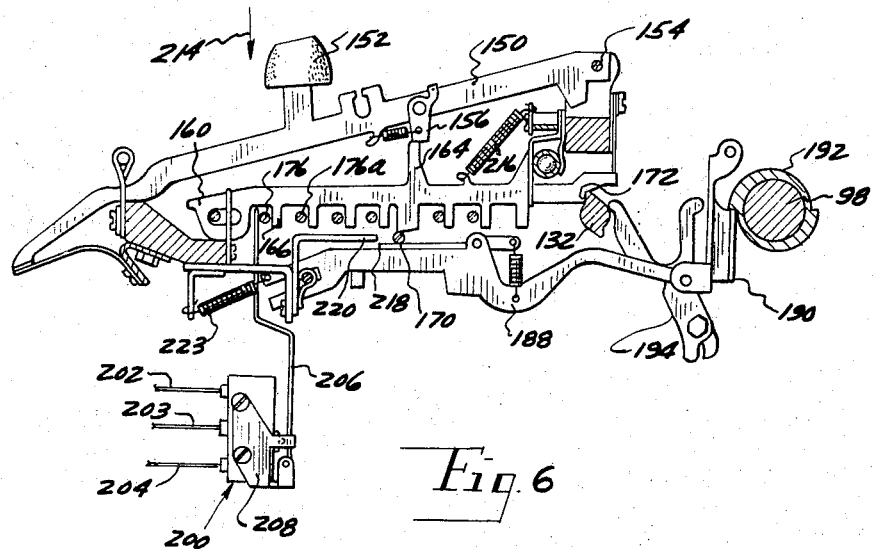
FIGURE 6 is another side elevational view of the apparatus shown in FIG. 5 in another operational position.

In general, the selection of a particular print character by depressing a selector button 152 in the direction of the arrow 214 in FIG. 6 results in pivotal movement of the selector member 150 about the shaft 154 to abuttingly engage the pawl 156 and the pawl lug 164. The interposer 160 is normally maintained in the uppermost position shown in FIG. 5 by a return spring 216. When the pawl engages the pawl lug 164, the interposer is downwardly displaced until the cam surface 172 is brought into position closely adjacent one of the cam portions of filter shaft 132 as shown in FIG. 6. Downward displacement of the interposer simultaneously moves the cycle lug 168 into engagement with the cycle clutch bail 170 to downwardly displace an abutment lever 218 from latching engagement with an abutment surface 220 and releases link 188. Spring means 223 actuates the latch link away from the shaft 98 and releases latch 190 from engagement with the cycle clutch sleeve 192. Cycle shaft is then free to rotate 180° until the next abutment surface 224 comes into engagement with the latch 190 again as shown in FIG. 7. The latch is returned into an abutting engagement position by the return mechanism 194 which is actuated through the filter shaft 132.

The filter shaft 132 rotates and cams the interposer 160 forwardly in the direction of the arrow 226 in FIG. 7 to cause displacement of one or more of the bails 176–176e associated therewith. Movement of the bails causes corresponding movement of the associated switch actuating arms 206 in the direction of the arrow 212 to close the switch 200 and complete a circuit through the lines 202, 204.

Writing unit functional operation mechanism

Figure 9:
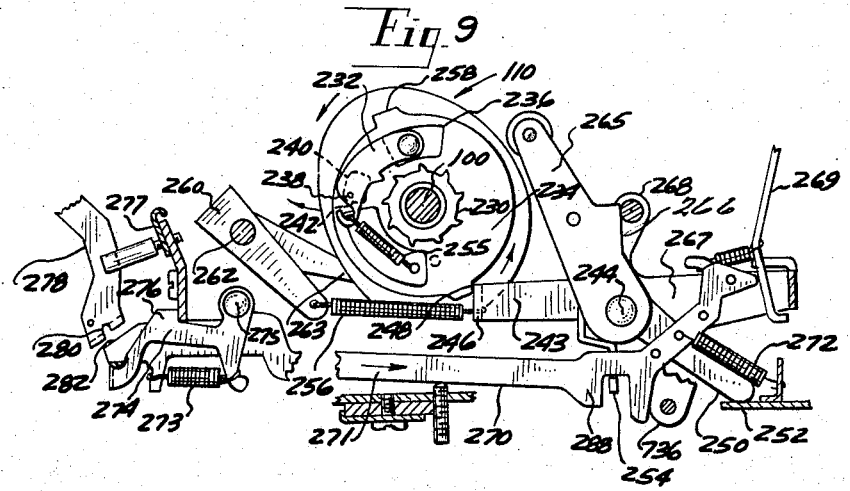
FIGURE 9 is a side elevational view of a portion of the functional operational mechanisms of the apparatus of FIG. 1.
Figure 10:
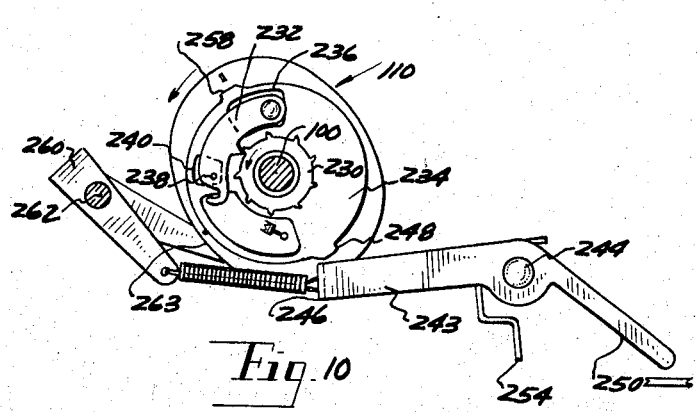
FIGURE 10 is a partial side elevational view of a portion of the mechanism shown in FIG. 9.

In general, all powered functional operations are powered by operational cam shaft 100. The functional operations include space bar, backspace, carrier return, indexing, and shift operations. The tabulator is the only non-powered functional operation and is manually operable. However, during automatic operation of the writing unit, power means are provided to actuate the tabulator as hereinafter described. The space bar, backspace, carrier return, and indexing mechanisms are operated by cam assemblies 110 mounted on the operational cam shaft. One type of cam assembly is a double lobed cam 110, as shown in FIGS. 9 and 10, which is operable in only 180° increments of rotation and powers the space bar and backspace mechanism. Another type of cam assembly (not shown) is a single lobed cam requiring 360° rotation to complete an operation which powers the engaging of the carrier return mechanism and operates the index mechanism.

Since the cam assemblies are selected for operation by identical mechanism, only the double lobed cam assembly 110 is described in detail. The functional operation desired is obtained by a selection system actuated through depressing a desired key lever. The cams of the cam assemblies are normally stationary until connected to the operational shaft 100.

Figure 11:
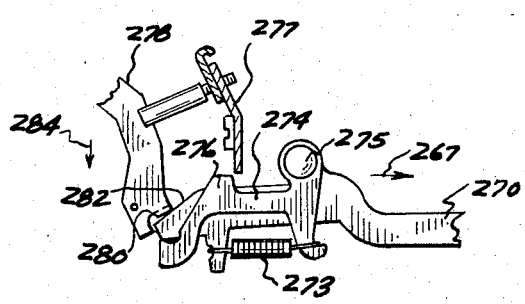
FIGURE 11 is a partial side elevational view of another portion of the mechanism shown in FIG. 9.

Referring now to FIGS. 9–11, a clutch ratchet 230 is fixed to the shaft 100 adjacent the cam 110. A pawl 232 is pivoted adjacent the ratchet and is pivotable into locking engagement with the clutch ratchet 230 to cause the cam 110 to rotate therewith. A clutch wheel or disc 234 is freely rotatably mounted and controls engagement of the clutch ratchet by the cam pawl. A pawl engaging abutment is formed in the wheel by an enlarged slot 236 and limits movement of the wheel. A pin 238 at the tip of the pawl fits into a hole 240 in the clutch wheel having a beveled control surface 242. When the clutch wheel is held stationary, movement of the cam causes the pin on the pawl to slide up the beveled side of the hole and disengage the pawl from the ratchet. A clutch wheel holding arm 243 is pivoted on a shaft 244. An abutment portion 246 is adapted to engage an abutment 248 provided on the clutch wheel and prevent rotation thereof. A locating arm portion 250 is provided on the other end of the arm 243 to engage a fixed abutment 252 and an actuating lug 254 is centrally connected to the arm 243. When the holding arm 243 is moved downwardly, the clutch wheel will be released. At that time the cam pawl spring 255 pulls the pawl into engagement with a tooth of the clutch ratchet 230 by merely rotating the clutch wheel out of the way. When the holding arm 243 is restored by a spring 256, the holding arm returns to a position of contact with an abutment 258 on the clutch wheel. The position of the cam assembly is positively located by means of a cam check pawl 260 which is pivoted on a shaft 262 and has a portion 263 adapted to engage and locate the cam 110 in a manner similar to that shown at 264 in FIG. 15.

The functional operation selection mechanisms are supported by a bracket located adjacent the cam assemblies. Actuation of the selection mechanisms controls movement of the associated cam means resulting in the desired functional operation through actuation of a cam follower 265 pivotally mounted on shaft 244 and having a cam surface 266 adapted to actuate a bail member 267 through a pin 268. The bail member is pivotally mounted on shaft 244 and operably engages a link 269. Each selection mechanism comprises an interposer 270 adapted to be slidably displaced to an operative position, in the direction of the arrow 271 in FIG. 9 by a spring 272. The interposers are held in an inoperative position by spring means 273 connected to a latch 274 which is pivoted on the interposer at 275 and has an abutment 276 engageable with a fixed bracket 277. In order to release the interposer for sliding movement, a key lever operated pawl 278 has an abutment 280 engageable with the end 282 of the interposer to cause downward pivotal movement in the direction of the arrow 284 in FIG. 11.

There are four interposers which operate through slots in an operational control bracket. Since the operation is similar only one interposer 270 is shown in FIGS. 9–11 and described in detail. When the interposer is pushed down by selection of a key lever, the interposer latch will be released from the bracket to allow the interposer to be snapped to the rear to obtain one of the functional operations by engagement with the lug portion 254 of the clutch release arm 243 with the lug 288 provided on the interposer. Engagement of the lug portion 254 with the lug 288 causes the clutch release arm 243 to pivot downwardly out of engagement with the clutch wheel 234 to allow the cam to be driven. The bail 267 is in the form of a bell crank adapted to convert the rotary motion of the cam into vertical linear motion at the rear by continuous contact with the cam surface 266 provided on cam follower 265. The carrier return and indexing means is operated by the bail 267 which is moved down as the cam follower is forced to the rear by the cam. The indexing mechanism is operated each time the cam operates by a link 269 engageable by the bail 267 near the rear of the cam follower. A similar backspace and space bar cam follower is designed to operate the backspace and space bar.

Punch code selecting means for functional operations

Figure 12:
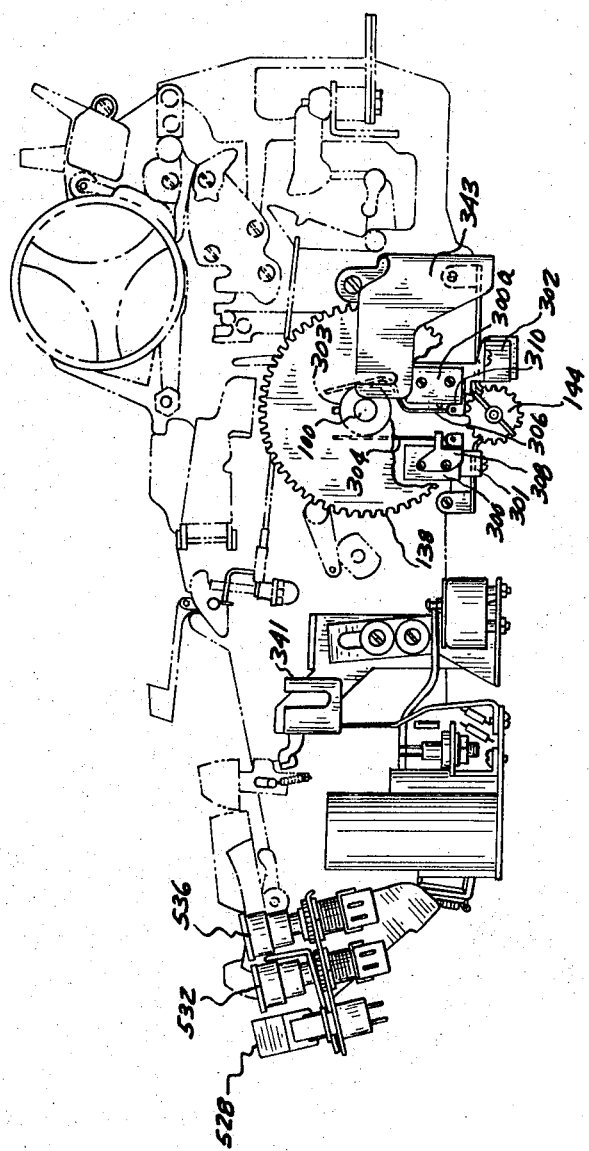
FIGURE 12 is an elevational view with parts removed, of one end of the apparatus of FIG. 1.

Referring now to FIGS. 8, 12, and 26, it may be seen that the aforesaid functional operations of the typewriter may be translated into coded punch-operating signals by means of electrical signal generating means in the form of switches 300–300e, similar to those previously described, which are fixedly supported by suitable bracket means mounted on the frame of the writer unit adjacent to the various functional operation mechanisms. For example, as shown in FIG. 12, switches 300–300a are mounted on brackets 301, 302 adjacent a shift cam 303 on operational shaft 100. Each of the switches includes switch actuating arms 304, 306 which extend upwardly into engagement with the cam 303 and are pivotally supported by brackets 308, 310, for circuit energizing movement in response to movement of the cam. The other functional operation mechanisms may similarly be utilized to actuate the switches by cam means. The manually operable tabulator may be operatively connected to its switch in any suitable manner through direct engagement with a portion of the selection or operation mechanism 311 as shown in FIG. 8. Thus, the selection of any of the powered functional operations by depressing a key lever and a key lever pawl 278 creates a coded signal through actuation of the associated switches by the selected functional operation mechanism. It is to be understood that a switch is provided for each of the functional operations including the shift switches 300–300a, tab switch 300b (FIG. 8), a backspace switch 300c, a space bar switch 300d, and a carrier return switch 300e.

Figure 13:
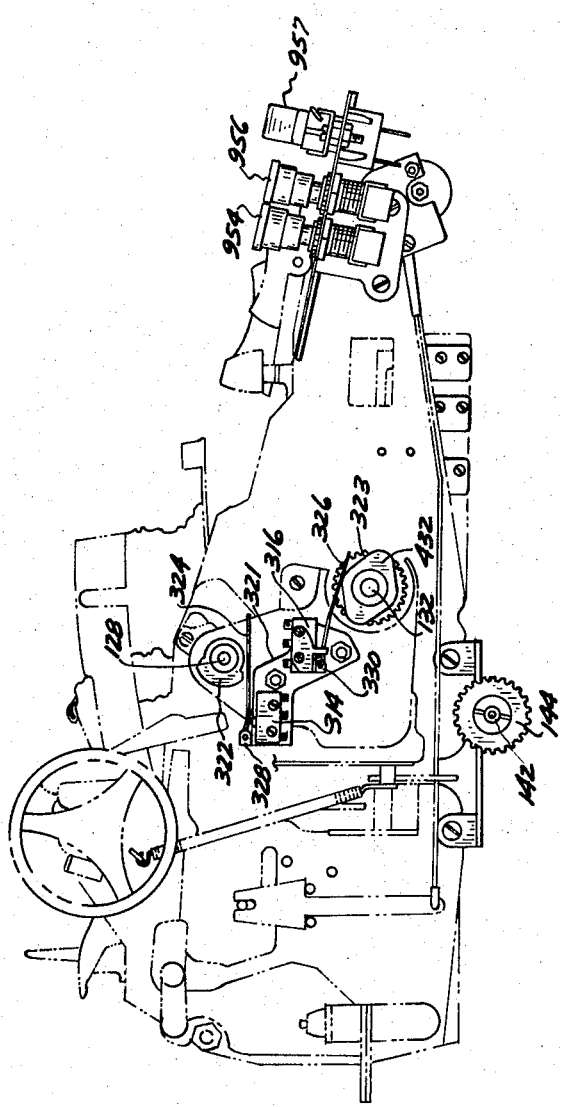
FIGURE 13 is an elevational view, with parts removed, of the other end of the apparatus shown in FIG. 1.

Additional switches of similar design are associated with the functional operational mechanisms and the print operation mechanism for purposes to be hereinafter described in detail. For example, as shown in FIG. 13, switches 314 and 316 are mounted on a bracket 321 adjacent a character interlock cam 322 on shaft 128 and a cycle cam 323 mounted on shaft 132. Each of the switches is provided with elongated actuating arms 324, 326, which extend outwardly for switch actuating engagement with the cam. The actuating arms are pivoted on brackets 328, 330 and are adapted to actuate the switches by pivotal movement relative thereto. The switch 316 is associated with the punch control system and the switch 314 is associated with the reader control system as hereinafter described.

Punch means

Figure 14:
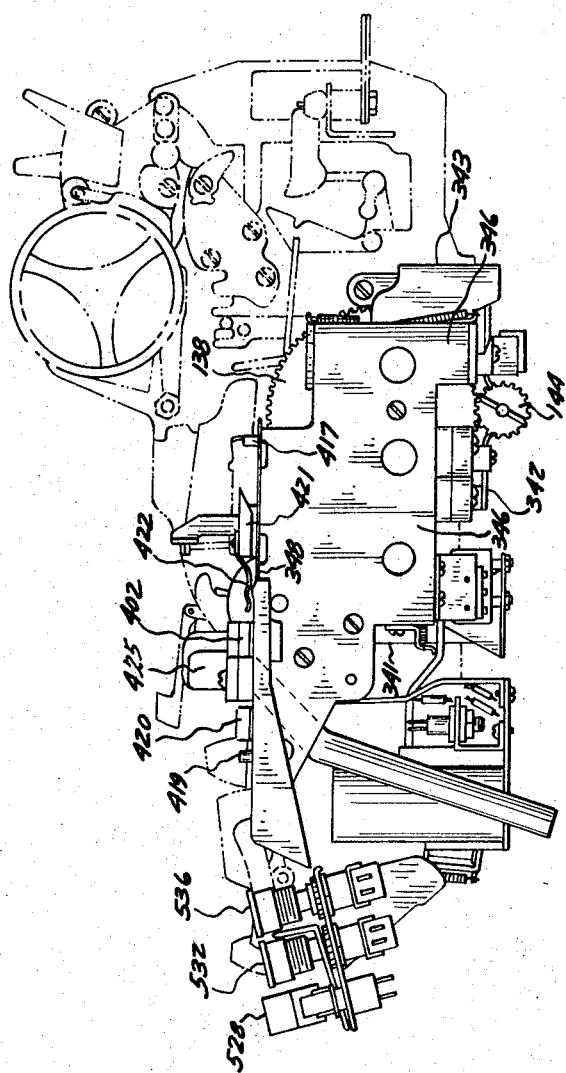
FIGURE 14 is an elevational view of one end of the apparatus shown in FIG. 1 with parts removed to show punch apparatus.
Figure 15:
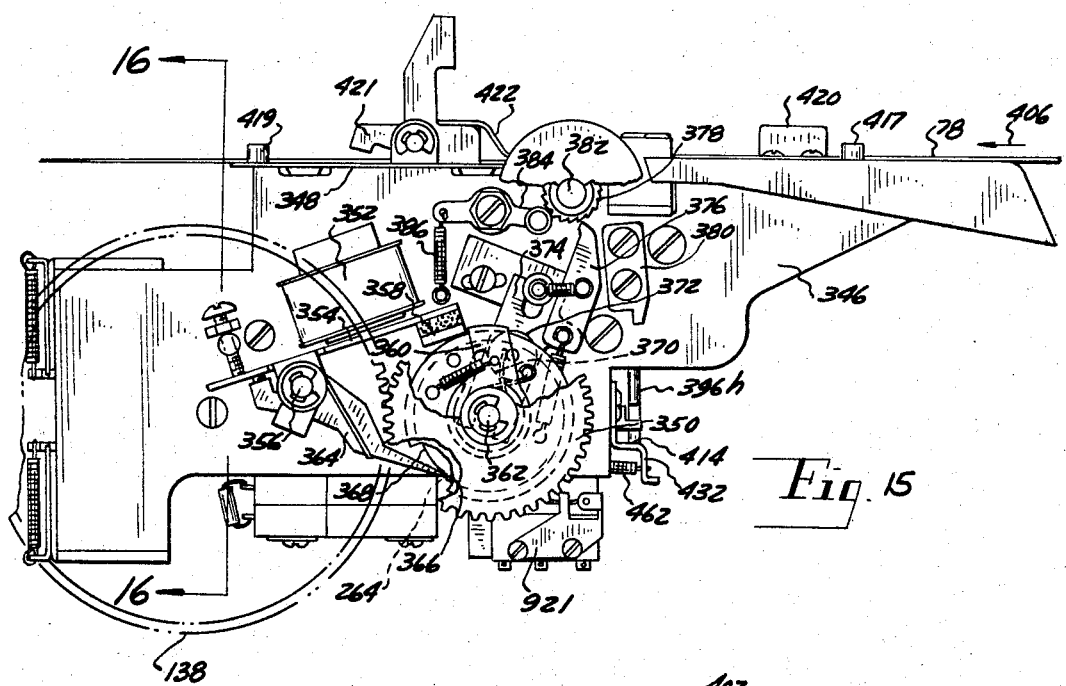
FIGURE 15 is another side elevational view of the punch apparatus in FIG. 14.
Figure 16:
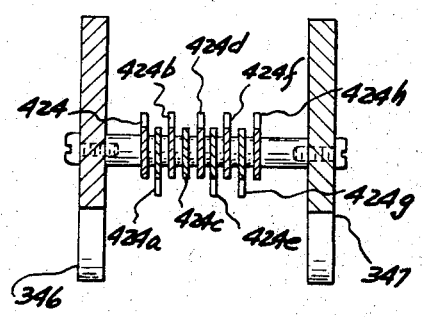
FIGURE 16 is a sectional view taken along the line 16—16 in FIG. 15.
Figure 17:
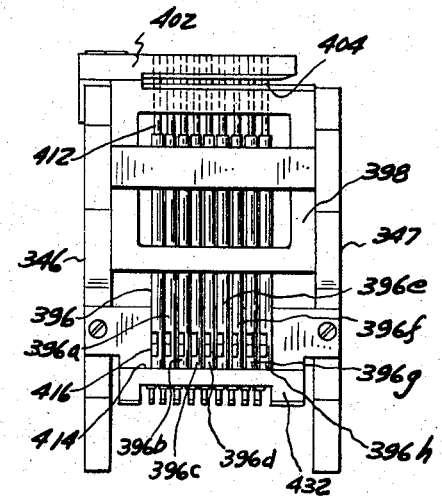
FIGURE 17 is an end view of the apparatus in FIG. 15.

Referring now to FIGS. 14–25, a punch means mounted on the right side of the writing unit is shown. A plurality of punch supporting bracket members, such as 341, 342, 343, 344, may be suitably connected to the typewriter frame as shown in FIG. 12 and FIG. 14. The punch components are mounted in a separate frame comprising spaced side plates 346, 347 and a top plate 348 as shown in FIG. 17. The punch drive mechanism is connected to the writing unit drive through the gear 138 and a drive gear 350, as shown in FIG. 15. Since the gear 138 is continually rotating, the gear 350 also continuously rotates. Consequently, a conventional one-way clutch mechanism is provided to actuate the punch in timed sequence with the writing unit so that each of the printing operations and/or the functional operations performed on the writing unit will result in actuation of the punch. The clutch mechanism includes a solenoid 352 which controls a latch arm 354 pivoted at 356. An abutment portion 358 is adapted to engage a clutch arm 360 pivotally mounted on a shaft 362 which is rotatably supported and extends between the side plates 346, 347.

A holding and restoring mechanism 364 is pivotally mounted on the shaft 356 and is engageable with an abutment 366 provided on a clutch disc 368 to properly locate and hold the clutch mechanism. Energization of the solenoid 352 actuates the latch arm 354 and permits clutch arm 360 to rotate. A cam 370 mounted on shaft 362 is rotated and a cam follower 372 mounted on a slide block 374 is outwardly displaced. The cam and cam follower arrangement is identical to the cam and follower arrangement more clearly shown in FIG. 29. The slide block 374 moves upwardly and displaces a pawl 376 mounted thereon into driving engagement with a ratchet wheel 378 and into abutting engagement with a pawl stop block 380. The ratchet wheel is fixedly connected to a shaft 382 extending between the side plates 346, 347 and is adapted to impart rotary movement thereto when driven by the pawl 376. A detent follower 384 is biased into engagement with the ratchet by a spring element 386 to control rotation of the ratchet and the shaft.

Figure 18:
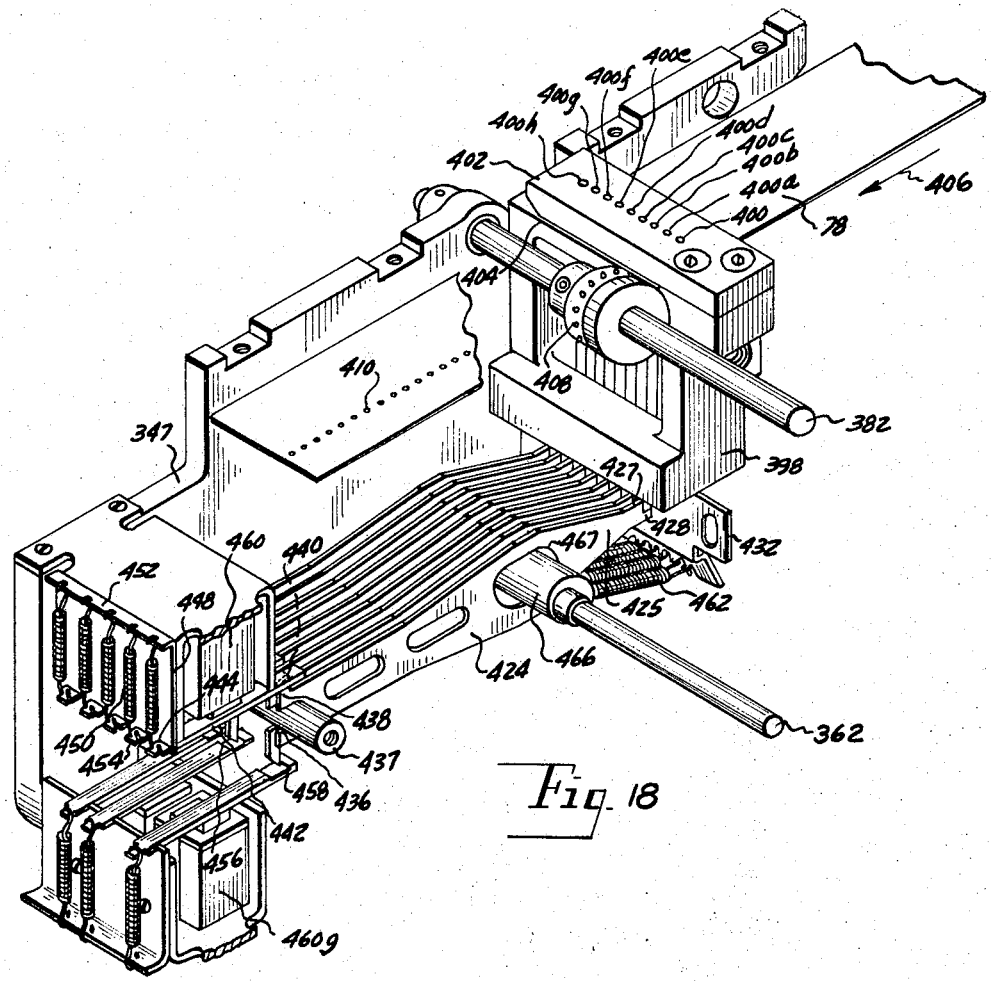
FIGURE 18 is a perspective view of the punch apparatus.

Referring now to FIGS. 17 and 18, the punch comprises a plurality of punch pins 396–396h which are reciprocably mounted in a frame 398 and are adapted to be selectively driven upwardly into punch holes 400–400h provided in a die plate 402 which is supported in spaced relation to the top of the punch frame 398 to provide a tape slot 404. The blank tape 78 to be coded is threadably receivable within the gap 404 and is driven in the direction of the arrow 406 by means of a sprocket wheel 408 mounted on the shaft 382. The sprockets of the sprocket wheel 408 are aligned with a centrally located punch 396c and punch hole 400c which continuously form drive holes 410 in the tape in alignment with and adapted for association with the sprocket wheel 408. The upper ends of the punches are provided with perforating portions 412 and the lower ends of the punches are seated on a flat abutment surface 414. Intermediate the ends of the punches, a series of actuating slots 416 are formed longitudinally of the punch shaft and located in positions substantially parallel to the path of movement of the tape 78 as indicated by the arrow 406.

Figure 19:
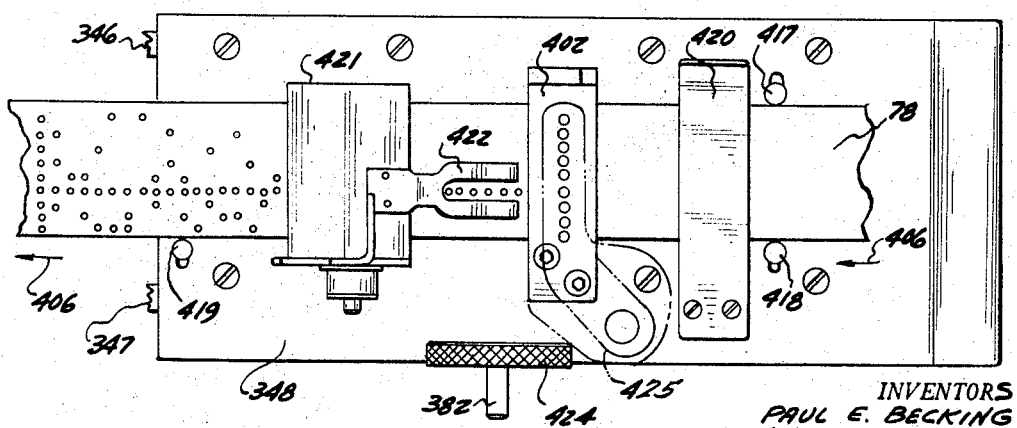
FIGURE 19 is a plan view of the punch apparatus.
Figure 37:
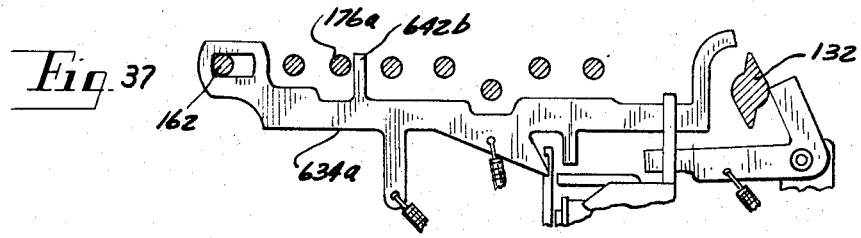
FIGURE 37 is a sectional view taken along the line 37—37 in FIG. 35.
Figure 38:
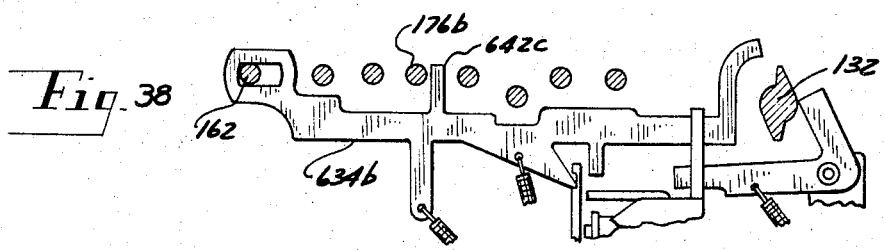
FIGURE 38 is a sectional view taken along the line 38—38 in FIG. 35.
Figure 39:
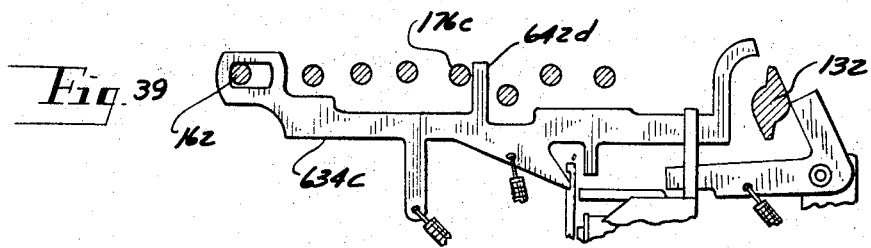
FIGURE 39 is a sectional view taken along the line 39—39 in FIG. 35.
Figure 40:
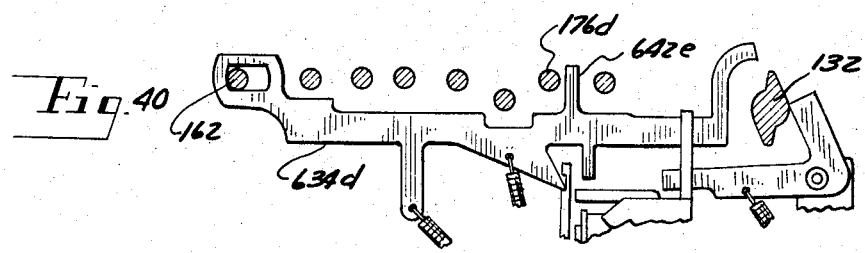
FIGURE 40 is a sectional view taken along the line 40—40 in FIG. 35.
Figure 41:
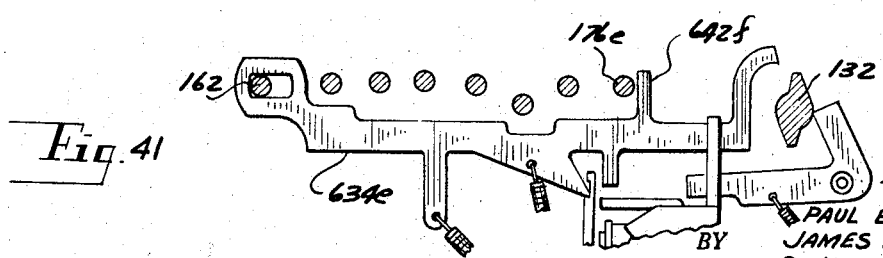
FIGURE 41 is a sectional view taken along the line 41—41 in FIG. 35.

As shown in FIG. 19, the frame includes an upper plate 348 having guide pins 417, 418, 419 and overlying plates 420, 421. A spring finger means 422 mounted on the plate 421 is cooperably associated with the sprocket wheel to obtain driving engagement between the sprocket wheel and drive holes. A hand knob 423 may be provided on the end of shaft 382 to facilitate tape insertion. A waste paper removing means 425 (FIGS. 14, 19) is associated with the die plate to remove the severed paper particles.

Referring now to FIGS. 16 and 18, the punches are adapted to be actuated into and through the tape by means of interposers 424–424h. A code interposer is provided for each of the eight code punches and a special interposer is provided for the drive hole punch. One end 425 of the code interposers adjacent the punch members are notched or stepped to define an abutment portion 427 having a maximum height and an end portion 428 of reduced height for a purpose to be hereinafter described. The height of the portion 427 is substantially equal to the height of the punch slots 416 and the height of the portion 428 is substantially less than the height of the punch slots to provide clearance between the punches and the interposers during some phases of operation. The end portion of the drive punch interposer 424c has a uniform height substantially equal to the height of its associated punch slot for continuous engagement with the punch. The notched ends of the interposers are slidably mounted in suitable slots provided in a comb member 432 and are slidable relative thereto into and out of a coding position.

The other ends of the code interposers are identical and have axially extending slot portions 436 which are slidably and rotatably received on a support shaft 437. It is to be understood that each interposer has similar associated parts as hereinafter described. A latch lug 438 having a beveled surface 440 is formed on the end of the interposers and extends outwardly for latching engagement with a latch bar 442. Some of the lugs extend in opposite directions to conserve space as hereinafter described. The latch bar is pivotally supported in a slot 444 in a comb member 448. Each latch bar is provided with a vertically extending spring 450 secured on a flange 452 at the other end of the comb 448 and engaged at the other end with a reduced end portion 454 of the latch bar. Consequently, a biasing rotative force is exerted on the end of the latch bars which tends to pivot the latch bar in the comb slot. The other end of the latch bar is provided with a notched portion 456 to form an abutment 458 adapted to engage the interposer lugs 438.

In the normal non-coding position of the interposers shown in FIGS. 18 and 20, the latch bar engages the interposer lug at 458, and the springs 450 exert forces in the direction of the arrow 459 to secure the latch bar in restraining engagement with the interposer. Although the latch bars may be mounted above and below certain of the interposers to conserve space, the actuation is identical. Solenoids 460–460g are controllably associated with each latch bar and are mounted in two groups in vertical stacked relationship above one another to conserve space. Energization of the solenoids causes movement of the latch bars away from the interposers, upwardly or downwardly, to release the interposers. When the interposers have been released, a previously tensioned spring means 462 connected at one end 463 to the comb member 432 and at the other end 464 to the interposers causes sliding displacement of the interposers 424 from the non-coding position to a coding position. In the coding position, the interposers are free to be driven in a predetermined pattern by a drive cam 466 mounted on shaft 362 and extending through elongated aligned slots 467 in each of the interposers.

As shown in FIG. 25, the drive hole punch interposer 424c has a blunt nose portion 468 and flat rear end 469 without a latch lug, associated latch bar or solenoids. The interposer is constantly held in an operative position by one of the springs 462.

Punch means operation

Referring now to FIGS. 20–24, the actuation of the punch means is shown in a step-by-step sequence by reference to a single interposer 424. In the normal position of the punch apparatus, shown in FIG. 20, the lug 438 is engaged in the slot 456 of the latch bar 442 and the interposer 424 is held against the bias of spring 462. The shaft 437 is located at the right-handmost portion of the slot 436 and the cam 466 is spaced from the rear end of the slot 467 as shown by gap 470. When the solenoid 460 is energized, the latch bar 442 moves upwardly in the direction of the arrow 472 as seen in FIG. 21 to release the interposer 424. The interposer is simultaneously moved in the direction of the arrow 474, FIG. 21, by the spring 462 a distance sufficient to locate the nose portion 427 within the confines of the slot 416 provided in the punch pin 396. It will be noted that in the non-coding position shown in FIG. 20, the nose portion 427 of the interposer is clear of the punch slot 416 as indicated by the gap 476 (FIG. 20) even though the reduced end portion 428 is within the slot.

When the interposer has been released and slidably displaced by spring 462 as shown in FIG. 21, the cam 466 and the side surface of the slot 467 are moved into abutting engagement as indicated at 482. At the start of an operational cycle, the high point of the cam is located approxiamtely at bottom dead center. As the shaft 362 rotates counterclockwise from the position of FIG. 21 to the position of FIG. 22, the cam is gradually moved into lifting engagement with the top surface of the slot as indicated at 484 in FIG. 22. The spring 462 maintains the side surface of the slot 467 in constant engagement with the cam. In FIG. 22, the nose portion 427 is moved into full engagement with the punch in the punch slot at 488. Consequently, the top of the nose portion is fully engaged with the top of the slot 416 in the punch and continued rotation of the cam results in lifting of the punch toward the tape. The interposer movement is accommodated by the slot and shaft connections 436, 437. When the shaft 362 has completely 180° of rotation, FIG. 23, the high point of the cam is engaged at the upper surface of the slot and the punch portion 412 is fully extended and has moved through and perforated the tape. The tape has previously been positioned for the punching operation by means of the ratchet wheel 378 and the drive shaft 382 shown in FIG. 15. During the next 90° of rotation of the shaft 362, the high point of the cam portion moves rearwardly into engagement with the end of the slot 467 at 489 as shown in FIG. 24. It is to be noted that the bottom of the nose portion is fully engaged with the bottom of slot 416 to provide a positive punch return. Consequently, the punch is positively retracted as the cam moves from the position of FIG. 23 to the position of FIG. 20. The interposer is moved rearwardly in the direction of the arrow 490 to relocate the lug 438 in latching engagement with the latch bar 442. As the interposer approaches the latch bar, the inclined rear surface 440 of the lug engages the latch bar and biases it upwardly until the lug moves into the slot. The solenoid 460 has previously been deenergized and the spring 450 pivotally biases the latch bar 442 downwardly in the direction of the arrow 459 (FIG. 24) to cause latching engagement between the lug and the slot. The nose portion 425 of the interposer is gradually moved away from the slot 416 and the punch 396 is positively returned to its rest position on the comb 432 as shown in FIG. 20. Even through the top surface of nose portion 427 of the interposer may become misaligned relative to the top of the slot 416 as shown at 491, the notch in the interposer provides sufficient clearance for the end portion 428 to remain in the slot without interfering engagement at the top of the slot. During the final 180° of rotation of the shaft 362, the interposer and the punch are positively returned to the original positions shown in FIG. 20. The clutch mechanism is actuated to engage the pawl 376 with the ratchet 378 (FIG. 15) and advance the tape one code column so that the tape will be in position for the next coded perforation recording the next operational sequence of the writer unit.

It will be understood that only those interposers having energized solenoids and released latch bars are operably engaged with the associated punches during a particular coding cycle. The other interposers are driven through the same cycle as the released interposers because of the continuous engagement of the cam 466 in the aligned slots 468. However, only the nose portions 428 of the latched interposers are located within the slots 416 of the associated punches and the vertical movement imparted to the interposers by the cam is less than the distance between the upper surfaces of portions 428 and the slots so that no actuating engagement takes place between the interposers and the punches. The movement of the latched interposers is accommodated at the latch end by the freely movable latch bars 442 which are constantly biased into engagement with the lugs by the springs 450.

*Punch means control system*

Referring now to FIG. 26, a circuit diagram schematically illustrating the control system for the punch means is shown. The punch means is powered by direct current obtained from a conventional alternating current source 500 through a secondary winding 502 and a full wave bridge rectifier 504 having a filter 506. The eight code solenoids 460–460g and the clutch solenoid 352 are connected in parallel between lines 510, 512 by lines 516–524 to provide individual circuits for each. A master on-off switch 526 is provided in line 510 which is operable by a control button 528 in the punch control cluster. The clutch solenoid is also connected by a line 530 to each of the individual code circuits for energization every time any one of the code circuits is energized. The cuutch solenoid circuit may be separately energized by actuation of a feed button switch 531 which is operable by a control button 532 in the punch control cluster. Solenoid 460g provides a delete signal to indicate that a code column is not correct, and is energizable by actuation of a switch 534 operable by a delete button 536 in the punch control cluster.

Each of the other solenoid circuits are code circuits which are energized in selected patterns according to writer unit operation. The code circuits are divided into print operation and functional operations. All of the print operation circuits are controlled by the cam operated cycle bail switch 316 in line 522. Selection of particular print operation circuits is obtained by the six selector switches 200–200e which are shown in parallel on a switch line 538. As hereinbefore described, the switches 200–200e are operable selectively and automatically by the writing unit mechanism. Accordingly, energiaztion of any of the solenoids 460–460e in response to print operations is dependent upon actuation of a particular individual print switch and, in addition, the cycle bail switch 316.

The functional operation circuits are selectively energized by the aforedescribed functional operation switches 300–300e. Actuation of switch 300b by the tab mechanism energizes solenoid 460, actuation of switch 300e by the carrier return mechanism energizes solenoid 460a, actuation of switch 300a by the shift mechanism energizes solenoid 460c, actuation of switch 300 energizes solenoid 460d, actuation of switch 300c energizes solenoid 460e. In order to limit the energization period of solenoid 460 in response to actuation of switch 300b, which may vary according to length of time of manual operation of the tabulation button, a condenser 540 and charging circuit 542 are provided to only momentarily energize the solenoid 460 when switch 300b is actuated regardless of the length of time of actuation. It will be readily apparent to those skilled in the art to which this invention relates that an extremely simplified punch control system has been provided wherein solenoids controlling the punches are selected by simple switch means operably connected directly to the various operating mechanisms of the writer unit to provide a coded record of the writer operation on a recording means.

*Reader means*

Referring now to FIGS. 27–30, the reader means for the subject writing system is shown to comprise a frame formed by spaced side plates 552, 554 and a top plate 555. The frame is suitably secured to the side of the writer unit on the frame thereof opposite the punch means by bracket members 556, 558 or the like. A drive shaft 560 is rotatably supported between the side plates and supports a reduction gear 561 which is driven by reader pinion 144. The cam 562 is permanently connected to the shaft 560 which is periodically engageable with reduction gear 561 by operation of a spring clutch means 564. The clutch means includes clutch release mechanism comprising a locking arm 566 and an associated latch 568 which is abuttingly engageable therewith in the disengaged position of the clutch. The latch is pivoted at 570 for movement to a released position in response to energization of a control solenoid 572. A disc 574 is mounted on the shaft 560 and has abutment means 576 adapted to engage a spring biased follower 578 which is also pivoted at 570. When latch 568 is released, the clutch engages to drive the shaft 560 and cam 562.

A cam follower 580 is connected to a slide block 582 which is reciprocably driven by cam rotation relative to a guide post 584. A pawl block 586 is mounted on the slide block and includes a pawl portion 588 adapted to engage a ratchet wheel 590 rotatably mounted on a shaft 592. A pawl stop 584 and a ratchet follower member 596 are associated with the mechanism. The shaft 592 supports a sprocket wheel 598 within the frame in a centrally located slot 600, as shown in FIG. 30, provided in the upper plate. A downwardly curved tape guide surface 602 is located adjacent the sprocket wheel and a spring guide plate 604 having finger portions 606, 607, shown in FIG. 28, is associated therewith to maintain driving engagement between the drive holes on tape 76 and the sprocket wheel to insure uniform and accurate movement of the tape through the reader. Additional tape guide means include a guide pin 608 and cover plates 609, 610. A hand wheel 611 is mounted on the end of the shaft 592 for manual operation of the sprocket wheel.

Translation means capable of generating coded signals in response to the information stored on the tape record of writing unit operation are mounted on the frame. In the preferred embodiment, referring to FIGS. 26 and 30, the translation means comprise light source means 612 and photo cell means 613 energizable thereby. The light source means may be mounted in spaced relation above the plate 555 on a bracket 614 including guide plate 609 which provides a tape slot 615 and an elongated light port 616 aligned with a plurality of holes 617–617g in the plate forming a code column. Each code channel has a corresponding hole and the width of the port 616 is sufficient to receive a band of light approximately equal to the width of a column of code holes in the tape.

The light source means comprises one or more bulb members 618 which are fixedly secured in parallel alignment on a support flange 619. As may be seen in FIG. 26, four bulbs are provided in spaced relation above a light concentrating means 620 which comprises a lens of translucent material adapted to project a continuous band of light substantially confined to the width of a code column and aligned with the holes 617–617g. Individual photo cell means 622–622g, only one of which is shown in FIG. 30, are mounted in each of the holes and supported beneath the plate 555 by a bracket 624 or the like. In the preferred embodiment, the photo cell means are in the form of conventional photo diode tubes having the tips 626 projecting through the holes and extending upwardly into the plane of the tape to cause slight upward displacement thereof as shown at 628. Consequently, as the tape passes over the upwardly extending tips, the code holes in the tape are exposed more directly to the light beam which results in more accurate reading of the tape and enables the tape to be passed through the reader at extremely high rates of speed. Furthermore, the constant friction of the tape on the surface of the tube tips 626 during tape movement keeps the tip clean and prevents any malfunction due to dirt accumulation or debris which might otherwise prevent light from reaching the photo cell means even though a code hole was present.

*Print operation reader signal input means*

Referring now to FIGS. 8 and 31–41, signal input means 632 (FIG. 8) for translating the print operational signals obtained from the coded tape in the reader means into equivalent writing unit operation are shown. The signal input means are shown in conjunction with the interposer 160 and the bails 170, 176–176e of the writing unit in FIG. 31. As may be recalled from the previous description, all of the printing operations of the writer unit are obtained through actuation of the selector bails 176–176e by depression of particular print keys resulting in movement of the interposers 160–160e to position lugs 166–166e in particular relationship to the selector bails for subsequent actuation thereof.

In order to actuate the writing unit in response to the signals obtained from the coded tape, a selector interposer 633 is provided for the cycle clutch bail 170 and input selector interposers 634–634e are provided for each of the six selector bails 176–176e to obtain actuation of bails in a predetermined pattern as originally selected by depression of certain key levers during coding of the tape. Since the interposers are substantially identical in construction, identical reference numerals are used to refer to identical portions of each interposer and only the interposer 633 is described in detail. Each selector interposer is provided with an elongated slot 635 on one end in which the pivot shaft 162 is received. A spring lug 636, a latch lug 637, a restorer lug 638, and a cam lug 640 are integrally formed on each interposer. Each interposer is further provided with an upwardly extending bail lug 642–642f intermediate the ends thereof. The lugs are variably located for engagement with one of the bails. The cycle clutch bail interposer 633 shown in FIGS. 31–33 is provided with a cycle clutch bail engaging lug 642.

Each interposer is provided with a latch means which is selectively operable by the input signal. The latch means is supported on the writing unit frame by suitable bracket means 644, 646 and includes a pivotally mounted latch bar 648. A latch slot 650 is formed at one end and the other end is pivotally supported at 652 in a slot in a comb plate 654. Each latch bar is connected at 656 to a spring element 658 which exerts a pivotal force on the latch bar and is connected at the other end 660 to the end of the comb 654. A bank of solenoids 662–662f are mounted adjacent the latch members on the bracket 644 and are selectively energizable to cause rotation of the latch bars against the bias of springs 658. Spring elements 666 and 668 are mounted on a shaft 670 supported in an extension 672 of the bracket 644. The other ends of the springs are connected at 674 and 676, respectively, to the lugs 636 and 637 of the interposer. The springs act in combination to exert forces imparting desired movement to the interposers. When the latch bar 648 is released from engagement with the end 678 of lug 637, the interposer moves from the inoperative position shown in FIG. 31 to the operative position shown in FIG. 32 in abutting engagement with one of the lobes of the filter shaft 132 at 679. A bell crank restoring member 680 is pivoted on a shaft 682 supported on the bracket means 683 and has a lift arm portion 684, a transverse abutment portion 685, and a cam arm portion 686 adapted to engage the filter shaft at 688. A spring 690 biases the cam arm into engagement with the filter shaft. In the inoperative latched position of the interposer, the cam lug 640 is spaced a sufficient distance from the filter shaft, as indicated by the gap 692, to prevent operative engagement therebetween.

In operation, energization of the solenoid 662 moves the latch bar 648 in the direction of the arrow 694 (FIG. 32) to release the latch lug 637 from engagement in the slot 650. Release of the latch bar results in pivotal downward movement of the interposer about the shaft 162 in the direction of the arrow 696 (FIG. 32). The downward movement of the interposer causes engagement of the cycle lug 642 with, and actuation of, the cycle clutch bail 170 at 698. Cam lug 640 is moved into engagement with the filter shaft 132 at 679. Rotation of the filter shaft 132, in the direction of the arrow 700 in FIG. 33, drives the interposer 633 away from the filter shaft in the direction of the arrow 702. The interposer slides rearwardly on the shaft 162 in the slot 635 and the cycle clutch bail 170 is cleared from engagement with the cycle clutch bail lug 642. Springs 666, 668 are extended as the lugs 636, 637 move rearwardly. The latch bar 648 is engaged by return lug 638 and moved away from the solenoid 662. When the cam peak 135 clears the cam lug 640, the springs return the interposer to the position shown in FIG. 32 and the cam arm portion 686 is engaged by the opposite cam peak 136, as shown in FIG. 34, to rotate the lift arm 684 upwardly resulting in upward movement of the interposer to return the latch lug tip 678 into the slot 650 of the latch bar and the interposer to the position of FIG. 31.

Referring now to FIG. 35, it may be seen that the six character selecting interposers 634–634e are supported in parallel spaced relation with the cycle clutch bail interposer 633 in a series of guide slots provided in the upper portion of bracket 644. The restorer 680 is in the form of a U-shaped member having spaced lift arm portions 684 and 684a (not shown) to support the transversely extending abutment portion 685, which is adapted to operate all of the interposers. The varying positions of the bail lugs are shown in FIGS. 36–41 and include the lugs 642a–642f provided for each of the bails 176–176e, respectively. The interposers are otherwise identical to the interposer 635. The character selection bails are operated by rotation of the filter shaft whenever the corresponding interposer solenoid has been energized to release the interposer for movement into operative engagement with the filter shaft. The unlatched interposers remain in a spaced inoperative position relative to the filter shaft and the associated bails are not actuated during rotation of the filter shaft.

The bank of interposers, interposer latches and interposer return mechanism are mounted at the bottom of the typewriter unit in a convenient place, as at 632 in FIG. 8, for actuation of the various selector bails and for association with the filter shaft. It may thus be appreciated that the input interposers are capable of operating the writing unit mechanism through the selector bails 176–176e without actuation of any of the writing unit interposers 160, key levers 150, or associated mechanisms. Accordingly, when the writing unit is being operated automatically through the input signals obtained from the coded record, none of the keyboard selection mechanisms are actuated nor is there any movement of selection mechanisms except for the actuation of the selector bails and associated printing mechanisms.

*Functional operation reader signal input means*

Referring now to FIGS. 8, 42 and 43, a second group of mechanisms 730 (FIG. 8) for translating the signals obtained from the coded record relating to the space bar, backspace, carrier return and index functional operation of the typewriter are provided. The mechanisms are associated with portions of the operational selection mechanisms of the writing unit previously described with reference to FIGS. 9–11 including interposers 270–270c, interposer return mechanisms 736, and interposer latches 274. As may be recalled by reference to FIGS. 9–11, the interposers 270–270c are adapted for operation by depression of selection key levers 278 resulting in release of the associated latch 274 and permitting the interposer to be moved rearwardly into an operational position.

In order to obtain a similar operation in response to the code signals obtained in the reading means, a code translating mechanism is mounted beneath the typewriter adjacent each of the functional operation selecting interposers on suitable bracket means 740, 741, and 742 which are suitably secured to the writing unit frame. Since the mechanisms for each of the interposers 270–270c is identical, only the mechanism associated with interposer 270 is described in detail. Each mechanism comprises a latch release lever 744 which is pivoted at 746 and provided with a latch engaging lug 748 on one end. A beveled nose portion 750 is provided on the other end for engagement with a latch bar 752 having a latch slot 754 formed at one end. The release lever is slidably mounted in a comb portion 756 on the bracket 740 and a spring 758 biases the lever in the direction of arrow 760. Latch bar 752 is pivotally supported in a slot on a comb element 762 at 764. A spring element 766 is secured at 768 to the end of the latch bar to exert a force in the direction of arrow 770 and cause engagement with the nose 750. Solenoids 772–772c are provided to actuate the latch bars against the bias of springs 766 and release the levers 744 resulting in pivotal movement of the levers under the influence of springs 758. Abutment 748 is moved into engagement with the latch 274 and disengages lug 276 to permit the interposer 270 to slide into the operative position shown in FIG. 43.

A restoring means is also provided and comprises a return link 776 loosely connected at one end 778 in slots 780 in the release levers. The other end of link 776 is pivotally connected at 782 to a lever 784 which is pivotally mounted on bracket 742. The other end 786 of lever 784 is adapted to be actuated by a pin 787 mounted on the restorer 736 in the direction of arrow 788 during restoration of the interposer 270. A spring 789 biases the lever into engagement with the pin 787. Rotation of link 784 causes movement of the link 776 in the direction of the arrow 790 and return movement of the latch bar 744 in the direction of arrow 792 from the release position shown in FIG. 43 to the latch position shown in FIG. 42. It should be understood that each of the space bar, backspace, carrier return and index functional operation selection interposers of the writing unit are actuated in a similar manner by similar solenoids and linkages.

Referring again to FIG. 8, an upper shift rotary solenoid 793 is directly connected to the writing unit shift mechanism for operation thereof. A lower shift solenoid 794 is also associated with the writing unit shift mechanism and acts as a lock when the upper shift solenoid is energized and as a release when energized. A tab actuating solenoid 796 is mounted adjacent the writing unit tab mechanism and is directly connected thereto by linkage 798. Accordingly, the functional operations of the writing unit are duplicated in response to signals obtained from the coded record without actuation of any of the other selection mechanisms of the writing unit and, as with the print selection keys and key levers, none of the functional selection keys or key levers are operated except for the manual tab key lever.

*Input signal control system*

Referring now to FIG. 44, the control system for translating the information stored on the coded record means into corresponding writer unit operation is diagrammatically illustrated. The power source 500 of alternating current is converted to direct current by conventional bridge rectifiers 812, 814. Each of the photo diode tubes 622–622g is associated with individual amplification circuits 816–816g. Since the circuits are identical, only one tube 622 and one circuit 816 are shown for illustrative purposes. Each circuit controls energization of one of associated relays 818–818g which conditions the various input signal solenoids for selective energization. For convenience of description, the code perforations on the tape may be divided into longitudinally extending code channels 1–8 and transverse code columns 10 as shown in FIG. 28. For example, coil 818 is energized by the number one code channel circuit 816 and actuates switches 820 and 820a controlling solenoids 662 or 796. Similarly, the number two code channel circuit 816a actuates switches 822 and 822a. The number three code channel circuit 816b operates switches 824 and 824a. The number four code channel circuit operates switches 826 and 826a. The number five code channel circuit operates switches 828 and 828a. The number six code channel circuit operates switches 830, 830a. The number seven code channel circuit operates switches 832, 832a, 832b. The number eight code channel circuit operates switch 834. Although only one photo diode 622 and amplification circuit 816 are shown, it is to be understood that there are eight such photo diodes and amplification circuits corresponding to the eight channel codes utilized in the preferred embodiment.

The photo diode circuits are connected to the power source through lines 835, 836. As shown in FIG. 30, a plurality of control cams 837, 838, 839 are mounted on the reader drive shaft 560. The cams actuate associated switches 837a, 838a, 839a shown in FIG. 44. Switch 837 controls energization of the photo diode circuits and is operable by the cam 837 mounted on the reader shaft and is closed when the reader shaft is at rest. After the reader clutch is energized and the shaft starts to turn to advance the tape, the switch 837a is opened as the cam rotates and remains open during advance of the tape so that the photo diode circuits will not be operated thereafter until the tape is advanced to the next code column. The amplification circuits are in the form of printed circuits mounted on printed circuit boards 841–841g, as shown in FIG. 46, and include a pair of transistors 842, 844 which are connected in parallel between lines 835, 836. The transistors are responsive to changes in resistance caused by light changes on the photo diode tube to cause energization of the coil 818 through lines 845, 846 in a conventional manner. As shown, the photo diode circuit 847, the control cam circuit 848, the amplification circuit 816, and the relay circuit 849 are adapted for jack and plug connection facilitating assembly, minimizing parts and conserving space.

The control system further includes manually operable means to start and stop operations of the input means and automatic means to continuously operate the writer unit in proper sequence, after manual start, in response to signals generated from the record tape. Initiation of automatic writing controlled by the eight channel tape passing through the reader means is obtained by closing a start switch 850 to energize a start relay 852 through lines 853, 854, 855, 856 and 857. Energization of the start relay closes switches 858, 860 to complete a holding circuit for the start relay through lines 861, 862, 863, 864, 856, 857. When the reader is turned on, a code column is already previously located over the photo diodes and is immediately "read." Accordingly, certain of the relay coils 818 are energized to activate the associated switches in accordance with the code on the tape. A silicon control rectifier 865 is energized through lines 861, 862, 863, 856 and a line 866. The rectifier is triggered during automatic operation through line 867 by the closing of switch 860 which allows a capacitor 868 to energize a line 869 through a normally closed switch 870 and lines 869, 871, 872 through normally open but then closed switch 839a. The rectifier energizes a line 879 which is connected to a line 880 through normally closed relay switch 834. The switch 834 is closed whenever a print operation or functional operation signal is being translated. Whenever a channel eight code signal, which represents a delete or error signal is translated, the switch 834 is opened and none of the print or function solenoids will be operable. The line 880 is connected either to the functional solenoids or to the print solenoids through the switch 832. The switch normally connects line 880 to the functional solenoids 772, 772a, 772b, 793, 794, 796. When a channel seven code signal is received, the switch is actuated to connect the line 880 to the print solenoids 662–662e depending on the condition of switches 820, 822, 824, 826, 828, 830. A channel seven code signal is received every time a print operation is being translated. When an operational function is being translated there will be no channel seven code signal.

The print solenoids are connected in parallel between lines 881 and 882 by solenoid circuits 884–884f. The print operation solenoids are connected in series by lines 886–886e, between line 880 and a line 888. The functional operation solenoids are connected in series to prevent any possibility of simultaneous functional operation of the writing unit. The coding is designed to provide only one functional operation translation at a time. A stop relay 890 is provided in line 888 and controls normally closed stop switch 892 between lines 862 and 863. If switch 834 remains closed and no functional solenoid switch is operated, the stop relay will be energized to open switch 892 and deenergize the start relay holding circuit.

When the silicon control rectifier 865 energizes line 879, a reader clutch circuit is also energizable through a line 896, normally open switch 832b, line 898, reader clutch solenoid 572, normally closed switch 838a, line 900, normally open switch 832a, a line 902, a switch 904 or a switch 905 and a line 906. The circuit is energized only when switches 832, 832a, 832b are actuated by print operation signals. The reader clutch solenoid is energized during functional operation input signals by a silicon control rectifier 908 through a line 910, switch 832b, line 898, switch 838a, line 900, switch 832a, and a line 912. A condenser 914 energizes the control rectifier 908 upon actuation of a switch 916 through a line 918, a line 919, and a line 920. A condenser charging circuit is provided by a line 921, the switch 916, and line 918. Assuming that the initial code signal is a print signal, the switches 832, 832a, 832b are actuated to energize the clutch solenoid 572 and davance the tape to the next code column as the initial print or functional operation is being carried out by the writing unit. Energization of the clutch solenoid causes rotation of the cams 837, 838, 839. Switch 837a is immediately opened to prevent false code signals from reaching the solenoids. When the tape has been advanced one code column, the cam 838 opens switch 838a to deenergize clutch solenoid 572. As soon as the next code column arrives at the read position beneath the light source and over the photo diode tubes, switch 837a closes and the code signals from the next column will condition the control relay coils through the photo diode circuit 816. The cam 839 closes switch 839a to condition the rectifier 865 for energization immediately after the switch 837a closes and the switch 838a opens. Consequently, the next tape reading step occurs simultaneously with operation of the machine in response to the previously read code signal.

In order to permit the simultaneous operation, a series of interlock switches 922, 923, 924, 925, 316 are provided to disassociate the solenoids from the rest of the circuitry while the writing unit is performing its various functional operations in response to the previously fed in code and while the solenoid switches are being conditioned by the next code signals. The swtich 922 represents a switch, FIG. 15, mounted on the writing unit frame and actuable by the shift mechanism each time a shift operation takes place. The switch 923 represents a switch mounted on the writing unit, FIG. 8, and operable by the space or backspace mechanism. The switch 924 represents a carrier return switch which is suitably mounted on the writing unit and is actuable by the carrier return mechanism each time the carrier return is operated. The switch 316 represents a character interlock switch which is cam operated by the cam 323, shown in FIG. 13, and mounted on the shaft 128 of the writer unit. The switch 925 is a lever operated switch mounted on the writing unit, as shown in FIG. 8, for actuation by portions of the tabulator linkage. The interlock switches are normally open.

Whenever the writing unit begins operation in response to the previous signals, one of the interlock switches closes to energize a feed circuit and a feed relay 926. The feed circuit comprises line 855, a line 927, a line 928, and a line 929, and is only energized when one of the interlock switches are closed. Assuming that the previous code imparted a print function to the typewriter, the character interlock switch 316 is actuated as soon as or shortly after the time that the print shaft starts to rotate so that line 855 is connected to line 927 which actuates feed relay 926 through lines 928, 929. The feed relay controls switch 870, switch 904, and switch 916. When the switch 870 is actuated, a condenser charging circuit is completed through line 930 and switch 904 opens the anode circuit of the silicon control rectifier 865 to disassociate the control circuitry from the solenoid and switch circuitry.

The reader clutch solenoid 572 is actuated by energization of feed relay 926 by connecting condenser 914 to rectifier 908 through switch 916, and actuates the reader clutch mechanism to advance the tape. The reader cams 837, 838, 839 are rotated to sequentially actuate the switches 837a, 838a, 839a. Switch 837a is immediately opened to prevent false signals from being generated during tape movement. Switches 838a and 839a are actuated during approximately the first 120° of cam rotation and the last 120° of cam rotation to prevent the code signals from overlapping and limiting the input of signals from one code column to one revolution of the reader clutch and drive shaft. When the typewriter operation stops, the interlock switch is opened and the feed circuit is deenergized. When the feed circuit is deenergized, the feed relay 926 is deenergized and switch 870 returns to its normal position connecting the line 868 and the line 869 for energization of the silicon control rectifier 865 as soon as the reader cam switch 839a is closed. At that time the silicon control rectifier will send a pulse through the line 879 to initiate another cycle of operation. It will be understood that the other interlock switches operate in a similar manner.

Because the tab operation of the writer unit is manual, and because the tabulation sequence varies depending on the length of time that the tab selection button is depressed and the length of the tabulation, a special tab circuit is incorporated in the system and comprises lines 931 and 932 in which a tab interlock relay 934 is connected. A condenser 935 is provided to limit the time of energization of the relay. A switch 936 is operated by the relay 934 to connect lines 938 and 940 which will energize the feed relay 926 through line 928 to advance the tape as hereinbefore described. In order to advance the tape, whenever a delete or error signal is generated by a channel eight code signal, an oscillatory type circuit provided by lines 942, 944 and a delete relay 946 are energized by actuation of switch 834. The delete relay controls switch 905 and a switch 950 so that the feed relay will be energized and the tape will be fed until a correct code signal is received. The control system will operate automatically and continuously until a stop button 954, in the reader control cluster, controlling switch 955 is actuated or until a blank tape is received within the reader. When a blank tape is received in the reader, none of the switches 832, 834, 820a 830a will be actuated and, consequently, a stop relay 890 will be energized and open stop switch 892. A start button 956 and an on-off switch 957 are also provided.

Referring now to FIGS. 44 and 45, it may be seen that the electrical components and circuitry of the control system are mounted on a central printed circuit board 960 which is suitably secured to a portion of the reader frame. The central or "mother" board includes a relay circuit portion 962, a photo diode amplification circuit portion 964 and a central component supporting portion 966. Each of the photo diode amplification circuits is mounted on separate printed circuit boards which are slidably receivable in contact supports 970, 972. Each of the self-contained relay units is adapted to be plugged into the associated relay circuits on the portion 962. A diode board 974 may be mounted in a convenient location as shown in FIG. 8. Consequently, the entire reader control system is mounted as a unit adjacent the reader mechanism and is completely housed within the unitary casing of the writing system.

Since the inventive principles may be applied to various embodiments of the invention, it is intended that the appended claims be construed to include variations and modifications of the illustrative embodiment except insofar as limited by the prior art.

What is claimed is:

1. Punch mechanism comprising a punch plate having a series of punch guide holes formed therein, punch means mounted in each of said guide holes for reciprocable movement between a non-coding position and a coding position, said punch means having axially elongated drive slots formed intermediate the ends thereof, individual drive means for mechanically actuating said punch means between said positions by selective driving engagement with said punch means in said drive slots, abutment portions formed on said drive means by stepped surfaces and being received in said drive slots, and a common operating means to vary the location of said abutment portions in said drive slots between a position whereat one of said stepped surfaces is located in said drive slots to engage said punch means and cause reciprocable actuation thereof and a position whereat one of said stepped surfaces is withdrawn from said drive slots for disengagement relative to said punch means and to prevent driving engagement therebetween.

2. A punch device comprising a plurality of interposers, shaft means pivotally supporting said interposers at one end for pivotal and rectilinear displacement between a retracted position and an extended position, means to selectively move said interposers to the extended position by rectilinear displacement, latch means associated with said interposers to selectively retain said interposers in the retracted position and control movement thereof to the extended position, a plurality of cam slots, one of said cam slots being formed intermediate the ends of each of said interposers, a cam shaft extending through said slots and having cam portions engageable therewith and said cam slots and cam shaft being of a size permitting rectilinear movement of said interposers relative to said cam shaft between said retracted position and said extended position, the other end of each of said interposers having a nose portion, punch means drivingly engageable by the nose portions in the extended position of said interposers and being drivingly disengaged from the nose portions in the retracted position of said interposers, means to latch and unlatch said interposers and being selectively operable to permit movement of said interposers to the extended position in driving engagement with said punch means so that rotation of said cam means causes punching actuation thereof, and means to return said interposers to the retracted position after actuation of said punch means.

3. In a punch unit, a punch plate having a series of punch guides formed therein, a plurality of punches reciprocably mounted in said punch guides for movement between a coding position and a non-coding position, actuating slots formed in each of said punches, individual drive means movable between a retracted position of disengagement with said punches and an extended position of engagement relative to said punches and being adapted to engage said punches in said slots in the extended position to cause reciprocable actuation thereof, each of said drive means having aligned elongated slots located intermediate the ends thereof, cam means extending through said elongated slots in engagement with side surfaces thereof and being of a size permitting rectilinear movement of said drive means relative to said cam means between the retracted position and the extended position and being rotatable therein to cause movement of said drive means resulting in reciprocable actuation of said punches, and means to selectively move said drive means between the retracted position and the extended position.

4. The invention as defined in claim 3 and wherein: said last mentioned means of said punch unit further comprises a plurality of latch mechanisms adapted to latch said drive means in the retracted position relative to said punches and to prevent driving engagement with said punches in the retracted position, and solenoid means for selectively actuating said latch mechanisms and unlatching said drive means to permit driving engegement with said punches in the extended position.

5. In a writing system operable to prepare coded record means, a writing unit, encoding means for coding record means in response to operations of said writing unit, power shaft means extending longitudinally of said writing unit, a frame mounted on one end of said writing unit and supporting said encoding means, a plurality of punch members mounted on said frame for movement between a non-coding position and a coding position relative to said record means, a plurality of solenoid means mounted on said frame and being energizable in response to operation of said writing unit in accordance with a preselected code, latch means operable by said solenoid means, interposer means operable between said latch means and said punch members to actuate said members between said positions, said interposer means forming the only connecting means between said latch means and said punch members, means mounting said interposer means for sliding movement between an operating position and a non-operating position relative to said punch members and for pivotal movement, drive shaft means directly operably connected to said interposer means by cam means on said drive shaft means and cam follower means on said interposer means to cause pivotal actuation thereof resulting in a movement of said punch members between said positions, gear means connecting said shaft means and said drive shaft means, and clutch means controlling actuation of said drive shaft means and being operable in response to energization of one of said solenoid means to rotate said drive shaft means and actuate said interposer means.

6. The invention as defined in claim 5 and wherein said interposer means are mounted in spaced parallel relationship, slot means formed in each of said interposer means in transversely aligned relationship, said drive shaft means extending transversely of said interposer means through said slot means, and cam means mounted on said shaft means for driving engagement with said interposer means in said slot means to impart movement to said interposer means resulting in movement of said punch members between said positions.

7. The invention as defined in claim 6 and wherein said cam means comprises a single cam element mounted circumjacent said drive shaft means and extending through all of said slot means.

8. The invention as defined in claim 5 and having abutment means formed on said interposer means and said punch members for engagement to impart movement to said punch members through said interposer means, said abutment means on said punch members being formed by slots, said abutment means on said interposer means being formed by a stepped means adapted to be received in said slots and defining a portion of maximum height through which movement of said interposer means may be imparted to said punch members when located in said slots, and defining a portion of minimum height permitting movement of said interposer means without imparting movement to said punch members when located in said slots, means to longitudinally shift said interposer means when said latch means are actuated to move said stepped means in said slots to locate said portion of maximum height in alignment and engagement with said abutment means on said punch members to cause selective actuation of said punch members.

9. Encoding means operable to prepare coded record means or the like comprising a frame, solenoid means mounted on said frame, latch bar means pivotally associated with said solenoid means for movement between a latching position and an unlatching position in response to energization of said solenoid means, a plurality of punch members reciprocably mounted on said frame for movement between a non-coding position and a coding position, interposer means for actuating said punch members between said non-coding position and said coding position, said interposer means comprising for each punch member an elongated link, means reciprocably and pivotally supporting each link, one end of each link having latch means engageable with said latch bar means to secure each link in a non-operating position relative to the associated punch member, means to move each link to an operating position when said latch means is disengaged from each link, the other end of each link having connecting means drivingly connectible with the associated punch member in the operating position of each link to actuate the associated punch member between said non-coding position and said coding position, a slot formed intermediate the ends of each link, a drive shaft extending through said slot, and cam means mounted on said drive shaft and being engageable with each link to cause pivotal and reciprocable displacement thereof resulting in actuation of the associated punch member from said non-coding position to said coding position when each link is in said operating position and in subsequent movement of each link from the operating position to the non-operating position and into latching engagement with said latch bar means.

10. The invention as defined in claim 9 and wherein said connecting means comprises a stepped end portion having a series of steps of different heights, a slot formed in said punch member and adapted to slidably receive said end portion, one of said steps having a height adapted to abuttingly drivingly engage said punch member in said slot in said operating position of said link, and another of said steps having a smaller height and being disposed in said slot in said non-operating position of said link and being disengaged from said punch member during displacement of said link by said cam means to prevent actuation of said punch member.

11. Encoding means comprising a plurality of individual separately operable punch members, support means slidably supporting said punch members for movement between a non-coding position and a coding position, punch actuating link means provided for each punch member, means reciprocably and pivotally supporting said link means for reciprocable movement between an operating position and a non-operating position relative to said punch members and for pivotal movement in said operating position adapted to impart sliding movement to said punch members between said non-coding position and said coding position, latch means to secure said link means in said non-operating position, shift means to move said link means to said operating position when said latch means is released, power operable drive shaft means, a single cam means mounted on said drive shaft, means, and cam follower means integrally provided on said link means for engagement with said cam means to impart reciprocable movement to said link means between said operating position and said non-operating position and to impart movement to said link means in said operating position causing sliding movement of said punch members between said non-coding position and said coding position.

12. The invention as defined in claim 11 and wherein said drive shaft means comprising a single drive shaft, said cam means comprising a single cam member mounted on said drive shaft, said cam follower means comprising an elongated slot in each of said link means, and the slots in said link means being aligned to rotatably receive said single drive shaft and said single cam member therewithin.

13. The invention as defined in claim 11 and wherein said means supporting said link means comprises spaced slot means formed in each of said link means, said drive shaft means extending through one of said spaced slot means and slidably and pivotally supporting said link means thereon, and a second shaft means extending through the other of said spaced slot means and slidably and pivotally supporting said link means thereon.

14. The invention as defined in claim 13 and wherein said shift means comprises spring means biasing said link means toward said operating position and being effective upon release of said latch means to slidably displace said link means over said shaft means to said operating position.

15. The invention as defined in claim 14 and wherein one end of said link means is abuttingly engageable with said punch members to drive said punch members between said non-coding position and said coding position, and means causing abutting engagement between said one end and said punch members in said operating position and causing disengagement between said one end and said punch members in said non-operating position.

16. The invention as defined in claim 15 and wherein said last mentioned means comprises a slot formed in such punch members and variably dimensioned drive portions formed on said one end of said link means, said one end being continuously received with said slot with said variably dimensioned portions being shiftable relative thereto to cause selective engagement between said link means and said punch members in said operating position and disengagement therebetween in said non-operating position.

17. A punch mechanism comprising a plurality of punch members movable between a punching position and a non-punching position, separate link means linearly movable between a retracted position disassociated from said punch members and an extended punch operating position in engagement with said punch members for selectively actuating said punch members, support means supporting said separate link means for both pivotal and linear movement, selection means for causing selective linear movement of said link means between the retracted position and the extended punch operating position, connecting means integrally formed on said punch members and said link means to directly drivingly connect said link means to said punch members in said extended punch operating position, and drive cam means directly continuously connected to said link means to impart pivotal movement thereto in said retracted position and in said extended punch operating position resulting in actuation of said punch members between said non-punching position and said punching position by said link means in said extended punch operating position and to impart linear movement thereto between said retracted position and said extended punch operating position.

18. Encoding means operable to prepare coded tape means or the like comprising a plurality of punch members reciprocably mounted for movement between a non-coding position and a coding position, interposer means for actuating said punch members between said non-coding position and said coding position and being movable between an extended position of engagement with said punch members and a retracted position of disengagement relative to said punch members, latch means to control movement of said interposer means between said extended position and said retracted position, slot means formed in said interposer means, and cam means mounted in said slot means and being engageable with said interposer means to cause vertical and horizontal displacement thereof resulting in actuation of said punch members from said non-coding position to said coding position when said interposers are in the extended position and causing subsequent movement of said interposer means from the extended position to the retracted position.

19. Encoding means operable to prepare coded tape means or the like comprising a plurality of punch members reciprocably mounted for movement between a non-coding position and a coding position, interposer means for each of said punch members operable to actuate said punch members between the non-coding and the coding position and being slidably movable relative to said punch members between an operating position and a non-operating position, a stepped end portion of said interposer means having a series of steps of different heights, a slot formed in each of said punch members and adapted to slidably receive said end portion, one of said steps having a height adapted to abuttingly drivingly engage said punch members in said slot in the operating position of said interposer means, and another of said steps having a smaller height and being disposed in said slot in the non-operating position of said interposer means and being disengaged from said punch members during movement of said interposer means to prevent actuation of said punch members.

References Cited
UNITED STATES PATENTS

| | | | |
|---|---|---|---|
| 2,318,325 | 5/1943 | Nichol et al. | 197—20 |
| 2,362,027 | 11/1944 | Rabenda | 234—110 |
| 2,390,413 | 12/1945 | Ayres | 197—20 |
| 2,648,385 | 8/1953 | De Boo | 234—114 |
| 2,700,446 | 1/1955 | Blodgett | 197—20 |
| 2,859,851 | 11/1958 | Tholstrup et al. | 197—20 |
| 2,951,534 | 9/1960 | Woodbury et al. | 234—114 |
| 2,953,203 | 9/1960 | Granzow | 234—117 |
| 3,001,694 | 9/1961 | Simmerman et al. | 234—110 |
| 3,014,644 | 12/1961 | Clay | 234—123 |
| 3,022,000 | 2/1962 | Millis | 234—114 |
| 3,041,597 | 6/1962 | Naxon | 340—339 |
| 3,051,377 | 8/1962 | Bradbury | 234—115 |
| 3,070,292 | 12/1962 | Mathemel | 234—114 |

WILLIAM W. DYER, JR., *Primary Examiner.*

ANDREW R. JUHASZ, *Examiner.*

G. A. DOST, *Assistant Examiner.*